US006814283B2

(12) United States Patent
Fujimoto

(10) Patent No.: US 6,814,283 B2
(45) Date of Patent: Nov. 9, 2004

(54) INDIVIDUAL IDENTIFICATION CARD SYSTEM

(75) Inventor: Jun Fujimoto, Tokyo (JP)

(73) Assignees: Aruze Corporation, Tokyo (JP); Seta Corporation, Tokyo (JP)

(*) Notice: Subject to any disclaimer, the term of this patent is extended or adjusted under 35 U.S.C. 154(b) by 0 days.

(21) Appl. No.: 10/118,454

(22) Filed: Apr. 9, 2002

(65) Prior Publication Data

US 2003/0189093 A1 Oct. 9, 2003

(51) Int. Cl.[7] .................................................. G06K 5/00
(52) U.S. Cl. ........................ 235/382; 235/375; 235/380
(58) Field of Search ................................ 235/382, 375, 235/380, 382.5; 382/115; 340/5.1–5.2, 5.8–5.86, 825; 902/1–5; 380/28, 30; 713/150, 168; 705/64, 65

(56) References Cited

U.S. PATENT DOCUMENTS

| | | | | | |
|---|---|---|---|---|---|
| 3,590,333 | A | * | 6/1971 | Blum | 361/172 |
| 3,761,683 | A | * | 9/1973 | Rogers | 340/5.25 |
| 3,820,072 | A | * | 6/1974 | Blum | 340/5.8 |
| 4,438,824 | A | * | 3/1984 | Mueller-Schloer | 713/185 |
| 4,529,870 | A | * | 7/1985 | Chaum | 235/380 |
| 4,575,621 | A | * | 3/1986 | Dreifus | 235/380 |
| 4,593,183 | A | * | 6/1986 | Fukatsu | 235/379 |
| 4,630,201 | A | * | 12/1986 | White | 705/44 |
| 4,745,265 | A | * | 5/1988 | Douno et al. | 235/379 |
| 4,935,962 | A | * | 6/1990 | Austin | 713/159 |
| 4,965,568 | A | * | 10/1990 | Atalla et al. | 340/5.85 |
| 4,998,279 | A | * | 3/1991 | Weiss | 340/5.52 |
| 5,036,461 | A | * | 7/1991 | Elliott et al. | 705/44 |
| 5,086,215 | A | * | 2/1992 | Carsner et al. | 235/462.08 |
| 5,264,685 | A | * | 11/1993 | Eisermann | 235/382.5 |
| 5,623,637 | A | * | 4/1997 | Jones et al. | 711/164 |
| 5,687,087 | A | * | 11/1997 | Taggart | 700/233 |
| 5,799,288 | A | * | 8/1998 | Tanaka et al. | 705/43 |
| 5,944,310 | A | * | 8/1999 | Johnson et al. | 273/149 R |
| 6,024,287 | A | * | 2/2000 | Takai et al. | 235/493 |
| 6,040,786 | A | * | 3/2000 | Fujioka | 340/928 |
| 6,234,900 | B1 | * | 5/2001 | Cumbers | 463/29 |

FOREIGN PATENT DOCUMENTS

| | | |
|---|---|---|
| JP | 7-189553 | 7/1995 |
| JP | 11-3455 | 1/1999 |
| JP | 2000-8665 | 1/2000 |
| JP | 2001-67477 | 3/2001 |
| JP | 2001-204952 | 7/2001 |
| JP | 2001-229350 | 8/2001 |

* cited by examiner

*Primary Examiner*—Diane I. Lee
*Assistant Examiner*—Kumiko C. Koyama
(74) *Attorney, Agent, or Firm*—Leydig, Voit & Mayer, Ltd.

(57) ABSTRACT

An individual identification card system providing improved security includes (1) a random number generator; (2) individual identification cards having recorded on them respective individual identification codes made by affixing a random number generated by the random number generator to individual fixed codes peculiar to respective individuals; (3) an individual identification card recorder for recording on the individual identification cards respective individual identification codes, including an updated or additional random number when a specified event occurs; (4) a collation-purpose information control which controls collating the individual identification codes recorded on the individual identification cards; and (5) a collator which reads the individual identification codes recorded on the individual identification cards for collation with a code controlled by the collation-purpose information control.

23 Claims, 20 Drawing Sheets

INDIVIDUAL IDENTIFICATION CARD SYSTEM

BACKGROUND OF THE INVENTION

1. Field of the Invention

This invention relates to an individual identification card system.

2. Description of the Related Art

Increasing number of corporations are making it a practice to have individuals such as employees carry an individual identification card on which an identification code peculiar to the individual is recorded to identify the individuals as required using the individual identification card.

Identifying the individuals with the individual identification card is performed, for example, at the times of people coming to and leaving the work place to measure the work hours, at entrances of buildings and specified rooms to determine permission of entry and leaving, and to settle lunch accounts.

Also in recent years, it has become a practice that operation of a certain device is permitted to specified persons and when a person is about to operate the device, the person is identified with an individual identification card. In particular, most devices that handle money, bills and coins, as well as quasi money having the same values as money, are provided with the function of identifying operators with individual identification cards.

For example in game facilities provided with pachinko game machines and slot machines, many machines and devices handle bills, coins, and quasi money such as prepaid cards having monetary values. Such machines and devices are provided with the function of identifying operators with individual identification cards.

As described above, identifying individuals with individual identification cards has become to be performed in relation to important matters in corporate activities or the like, and such a tendency seems to intensify more and more.

Most of the conventional individual identification cards simply have identification codes recorded on them. So they can be easily counterfeited and when such cards are stolen and used, the devices that confirm the cards cannot recognize such facts.

While there is a system that a security code number (password, PIN) and an identification code peculiar to an individual are recorded on the individual identification card to collate a security code number entered from an entry section, the easiness of counterfeit remains unchanged. If the security code number is stealthily seen by someone when the number is being entered, the advantage of using the security code number is lost.

There is also a system that identifying individuals with a fingerprint collating device or the like is combined with identifying individuals with an individual identification card. However, as for the confirming function using the individual identification card, the above problem remains unsolved.

This invention is made in view of the above problems to provide an individual identification card system of higher security.

SUMMARY OF THE INVENTION

The present invention provides an individual identification card system comprising: random number generating means for generating random numbers; individual identification card recording means for recording an individual identification code on an individual identification card, said individual identification code being made up by affixing a random number generated with said random number generating means to a fixed individual code peculiar to every individual, a new individual identification code with renewed random number or a newly added individual identification code being recorded on said individual identification card when a specified event occurs; collation-purpose information control means that controls for collating the same individual identification codes as those recorded on said individual identification cards; and collating means that reads the individual identification codes recorded on said individual identification cards to collate with the codes controlled with said collation-purpose information control means.

Preferably, the above individual identification card system further comprises an individual identification card device provided with a card holding section capable of holding a plurality of said individual identification cards, capable of dispensing out said individual identification cards held in said card holding section, and capable of retrieving said individual identification cards in said individual identification card holding section, said individual identification cards to be retrieved being inserted from outside, and said individual identification card device having said individual identification card recording means.

Preferably, in the above individual identification card system, said individual identification card device has an entry section that permits entry of said fixed individual codes and entry of requests for dispensing out said individual identification cards and constituted so that, when said fixed individual code is entered through said entry section and a request for dispensing said individual identification card is entered, said individual identification code is recorded on one said individual identification card by means of said individual identification card recording means and said individual identification card is dispensed out of said individual identification card device.

Preferably, in the above individual identification card system, said individual identification card has card identification information, and said individual identification card device is constituted to give information letting said card identification information of said dispensed individual identification card correspond to said individual identification code recorded on said dispensed individual identification card, to said collation-purpose information control means so that said information is controlled with said collation-purpose information control means, and that said collating means performs also the collation process of said card identification information of said individual identification card, an object of collation.

Preferably, in the above individual identification card system, said individual identification card device has an individual's specified body part image obtaining section for obtaining the image of an individual's specified body part and an individual recognition means for identifying an individual based on the obtained image of said specified body part, said individual recognition means being located in a position in said individual identification card system, and wherein one condition of said individual identification card device to dispense said individual identification card is that the recognition with said individual recognition means results in that said individual is permitted to carry said individual identification card.

Preferably, in the above individual identification card system, said individual identification card device has a code erasing part for erasing said individual identification code from inserted said individual identification card, before said individual identification card inserted is retrieved in said card holding section.

Preferably, in the above individual identification card system, said individual identification card device has a time clock function means for controlling time information on said individual identification card.

The phrase, time information on said individual identification card, refers typically to the time point at which an individual identification card is dispensed, or at which the individual identification card is retrieved. The controlling of the time information includes a process necessary as the time clock function means. The necessary processes as the time clock function means are typically summing up the recorded time.

Preferably, in the above individual identification card system, said individual identification card device has a time clock function means for controlling time information on said individual identification card.

Preferably, the above individual identification card system comprises an operator restricting device having a door or lid that restricts individuals permitted to open and operate said door or lid; and in the system, said collating means is provided in relation to said operator restricting device.

BRIEF DESCRIPTION OF THE DRAWINGS

The invention will now be described, by way of example, with reference to the accompanying drawings, in which.

The basic Japanese Patent Application No. 2000-36451 filed on Feb. 15, 2000 is hereby incorporated in its entirety by reference into the present application.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

DESCRIPTION OF THE PREFERRED EMBODIMENTS (A) Embodiments

An individual identification card system applied to a currency control system in a game facility as an embodiment of the present invention will be hereinafter detailed in reference to appended drawings.

As an embodiment of the invention, a currency control system for use in game facilities will be hereinafter described in detail in reference to appended drawings.

While the type of game machines placed in game facilities related to this embodiment of the currency control system is not a question, for the sake of simplicity, the following explanation is made on the assumption that the game machine placed in the game facility is a pachinko (a kind of pin-ball) game machine. Also, the currencies associated with the currency control system of this embodiment are assumed to be bills and coins.

(A-1) Constitutions and Functions of the Embodiment.

Figure 1:
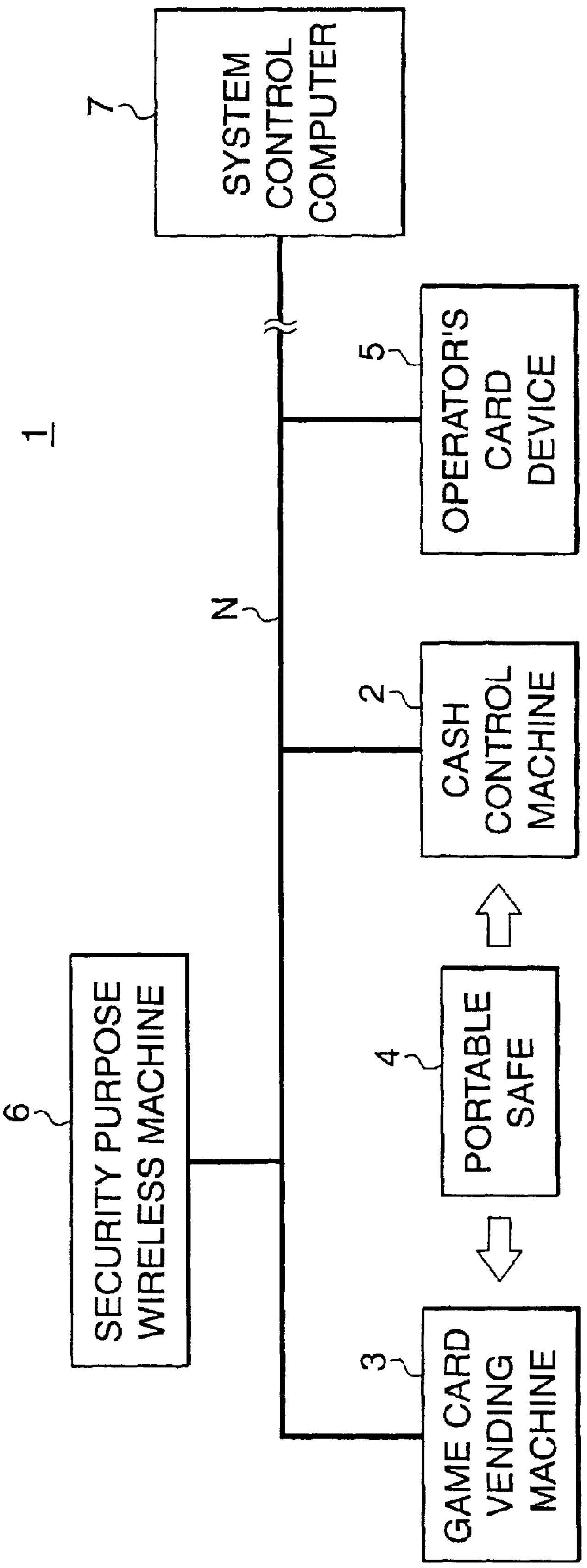
FIG. 1 is a block diagram of an embodiment of the entire constitution of a currency control system (system to which the individual identification card system is applied)

FIG. 1 is a block diagram of the entire constitution of a currency control system of this embodiment.

As shown in FIG. 1, the currency control system 1 of this embodiment is constituted by connecting each other: a cash control machine 2, a game card vending machine 3, a portable safe 4, an operator's card device (employee's card device) 5, a security purpose wireless machine 6, and a system control computer 7 with a dedicated line N (such as LAN) in a game facility.

The cash control machine 2, the operator's card device 5, and the system control computer 7 are placed for example in an office of the game facility. The game card vending machine 3 and the security purpose wireless apparatus 6 are placed in a hall of the game facility. The portable safe 4 is one that can be installed in or removed from either of the cash control machine 2 and the game card vending machine 3.

(A-1-1) Cash Control Machine 2.

The cash control machine 2 is used for unitary control of cash (money), which money is dispensed from or retrieved to.

Figure 2:
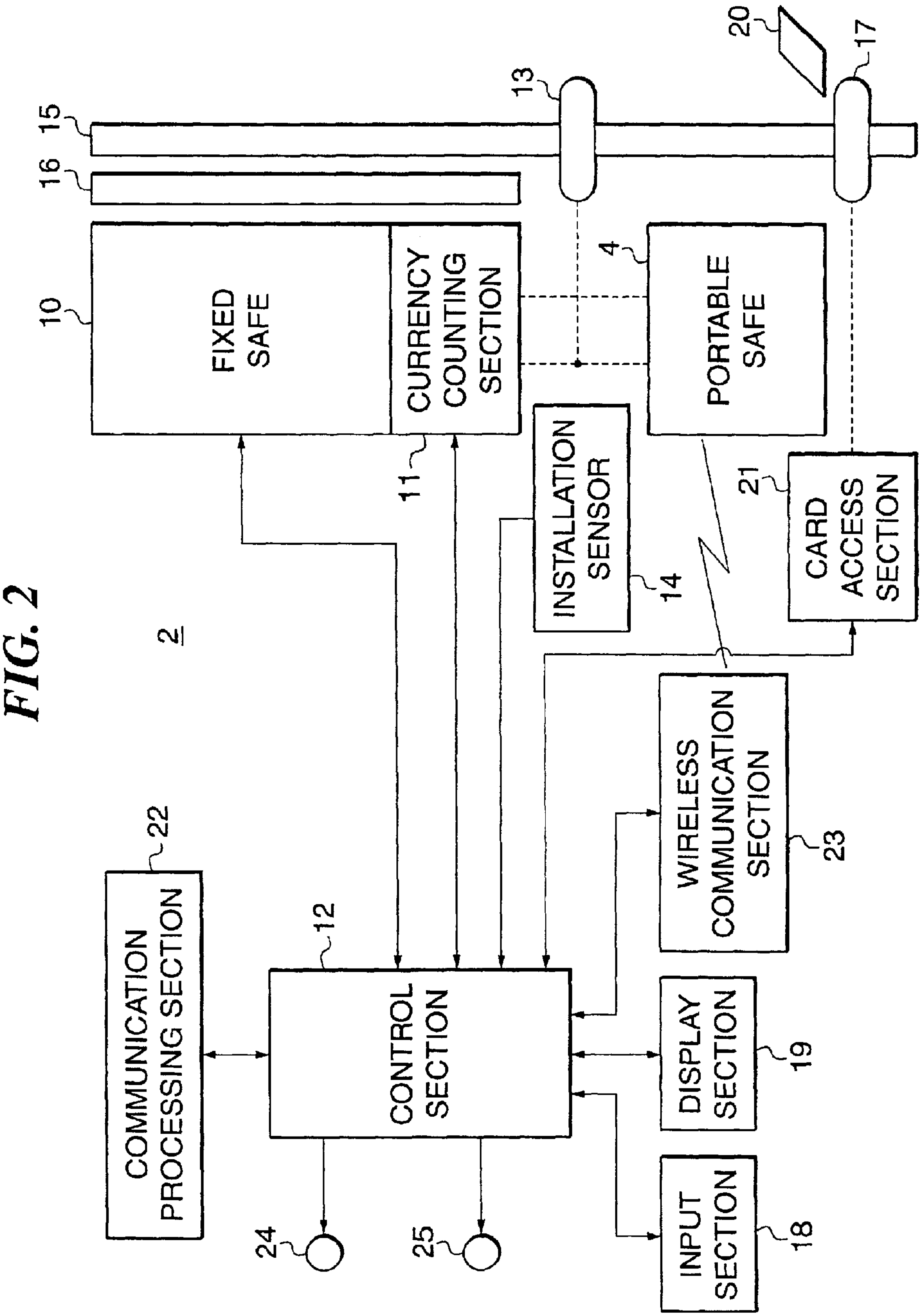
FIG. 2 is a functional block diagram of the embodiment showing the constitution of the cash control machine.

FIG. 2 is an explanatory drawing showing functional constitution of the cash control machine 2. It shows not only an electrical functional constitution but also a mechanical one.

The cash control machine 2, while its perspective view is not shown, is of a box shape and secured to a floor or the like.

In the cash control machine 2 are provided a fixed safe 10 and a currency counting section 11, and also a space for placing the portable safe 4. FIG. 2 shows the state of the portable safe 4 being installed in the internal space.

The fixed safe 10, while its internal constitution is not shown, holds bills and coins and performs the following functions under the control of a control section: transferring the bills and coins held therein to the portable safe 4 through a currency counting section 11, transferring the bills and coins it holds to the currency port 13, through the currency counting section 11, taking in bills and coins held in the portable safe 4 through the currency counting section 11, and taking in bills and coins inserted through the currency port 13 through the currency counting section 11. While the currency port 13 is shown as a single unit in FIG. 2, actually it is divided into a bill port and a coin port.

The interior of the fixed safe 10 is provided with not only a section for holding bills and coins but also mechanisms for rolling out bills and coins from its holding section, receiving bills and coins into the holding section, and their driving sections. Since such mechanisms and driving sections are the same as those of the automatic vending machines and bank ATMs, their explanation is omitted.

Incidentally, it is preferable to arrange so that replenishing and taking out currency to and from the fixed safe 10 without using the currency port 13 is done directly by bank clerks, security company personnel, or the game facility executives.

The currency counting section 11 is for counting the quantities of currencies: transferred from the fixed safe 10 to the portable safe 4, dispensed from the fixed safe 10 outside (to the currency port 13), transferred from the portable safe 4 to the fixed safe 10, or transferred from outside (from the currency port 13) to the fixed safe 10.

When counting currency outputted from the fixed safe 10, the currency counting section 11 performs counting action so that bills and coins of various denominations specified by a control section 12 are transferred in specified numbers. On the other hand, when counting currency transferred from the portable safe 4 to the fixed safe 10, counting is performed for every denomination of currency and the count information is given to the control section 12 so that all denominations of bills and coins held in the portable safe 4 are taken out. When counting currency transferred from outside (from the currency port 13) to the fixed safe 10, counting is performed for every denomination of currency and the count information is given to the control section 12, in the same way as all denominations of bills and coins held in the portable safe 4 are taken out.

In this embodiment, the currency counting section 11 is not provided with a mechanism for determining authenticity of bills and coins. In case of a large amount of replenishment to the cash control machine 2, the replenishment is made with the currency that is already checked for its authenticity when it is paid out from a bank. Also in the case of currency retrieved from the portable safe 4, authenticity is verified with the game card vending machine 3 which will be detailed later. Omitting an authenticity determining mechanism for currency as described above makes it possible to simplify the constitution of the cash control machine 2 and shorten counting operation time.

The constitution of the portable safe 4 will be described later. As described above, the cash control machine 2 has the space for installing the portable safe 4. It is arranged that, when the portable safe 4 is installed, the installation is detected by the safe installation sensor 14 and notified to the control section 12. The control section 12, as will be described later for its function, sets the portable safe 4 to a state capable of receiving and giving out currency. The portable safe 4 is provided with a built-in power supply for a security mechanism which will be described later. Although not shown in FIG. 2, it is arranged that power for operating other mechanisms is supplied from the cash control machine 2 when the portable safe 4 is installed.

The cash control machine 2 has double doors 15 and 16. The outer door 15 covers all of the fixed safe 10, the currency counting section 11, and the space for the portable safe 4. The inner door 16 covers the fixed safe 10 and the currency counting section 11. It is arranged so that, when some actions are to be taken to the fixed safe 10 and the currency counting section 11, both of the double doors 15 and 16 must be opened up.

The doors 15 and 16 are provided with lock mechanism (not shown in FIG. 2) that can be controlled with an electromagnetic or other electric mechanism. Locking and unlocking the lock mechanism is controlled with the control section 12.

The outer door 15 is provided with the above-mentioned currency port 13, and also with a card slot 17, an input section 18, and a display section 19, although their positions are not clear in FIG. 2.

The card slot 17 is to pass through the operator's card 20, for example an IC card carried by employees, bank clerks, or security company personnel, when it is inserted or drawn out. Incidentally, the operator's card 20 carried by the employees corresponds to the individual identification card of the present invention. The operator's card 20 inserted through the card slot 17 is transferred up to a card access section 21. The card access section 21 reads information stored on the operator's card 20 and gives it to the control section 12, or stores information given from the control section 12 onto the operator's card 20. For example, the control section 12 uses the information read from the operator's card 20 as one of conditions of unlocking the door 15 or 16. The control section 12 also stores history of operating the cash control machine 2 onto the operator's card 20.

The input section 18 has for example plural keys for the operator to use when the operator enters relevant information into the cash control machine 2. The entered information is given to the control section 12.

The display section 19 displays guidance message to prompt operation and status information of the cash control machine 2 under the control of the control section 12.

The cash control machine 2 has a communication processing section 22. The communication processing section 22 performs communication through the dedicated line N with other devices such as the game card vending machine 3 and the system control computer 7 under the control of the control section 12.

The cash control machine 2 also has a wireless communicating section 23. Information exchange between the portable safe 4 and the control section 12 is performed through the wireless communicating section 23. Here, the wireless communication may be performed either by means of electromagnetic wave or light. In the case of electromagnetic wave, the housing of the cash control machine 2 is preferably one that has electromagnetic shield effect. Incidentally, the information exchange between the portable safe 4 and the control section 12 may be performed through cables as a matter of course. In the following description, it is assumed to be performed through electromagnetic wave. The wireless communicating section 23 is assumed to include an antenna.

The control section 12 is for example a microcomputer to control the entire cash control machine 2. Details of the control will become clear later in the description of operation.

The cash control machine 2 is further provided with a buzzer 24 for alerting to functional anomaly in the cash control machine 2 or in the operation, and a card insertion lamp 25 for indicating the state of the operator's card 20 being inserted.

(A-1-2) Game Card Vending Machine 3.

The game card vending machine 3 issues game cards 30 required to receive pachinko balls (game balls) when playing pachinko games, and may be placed anywhere in the hall of the game facility. For example, it may be placed one for each group (so-called island) of game machines. In this embodiment, the game card vending machine 3 is referred to as an example of the currency handling device provided in the game facility.

Figure 3:
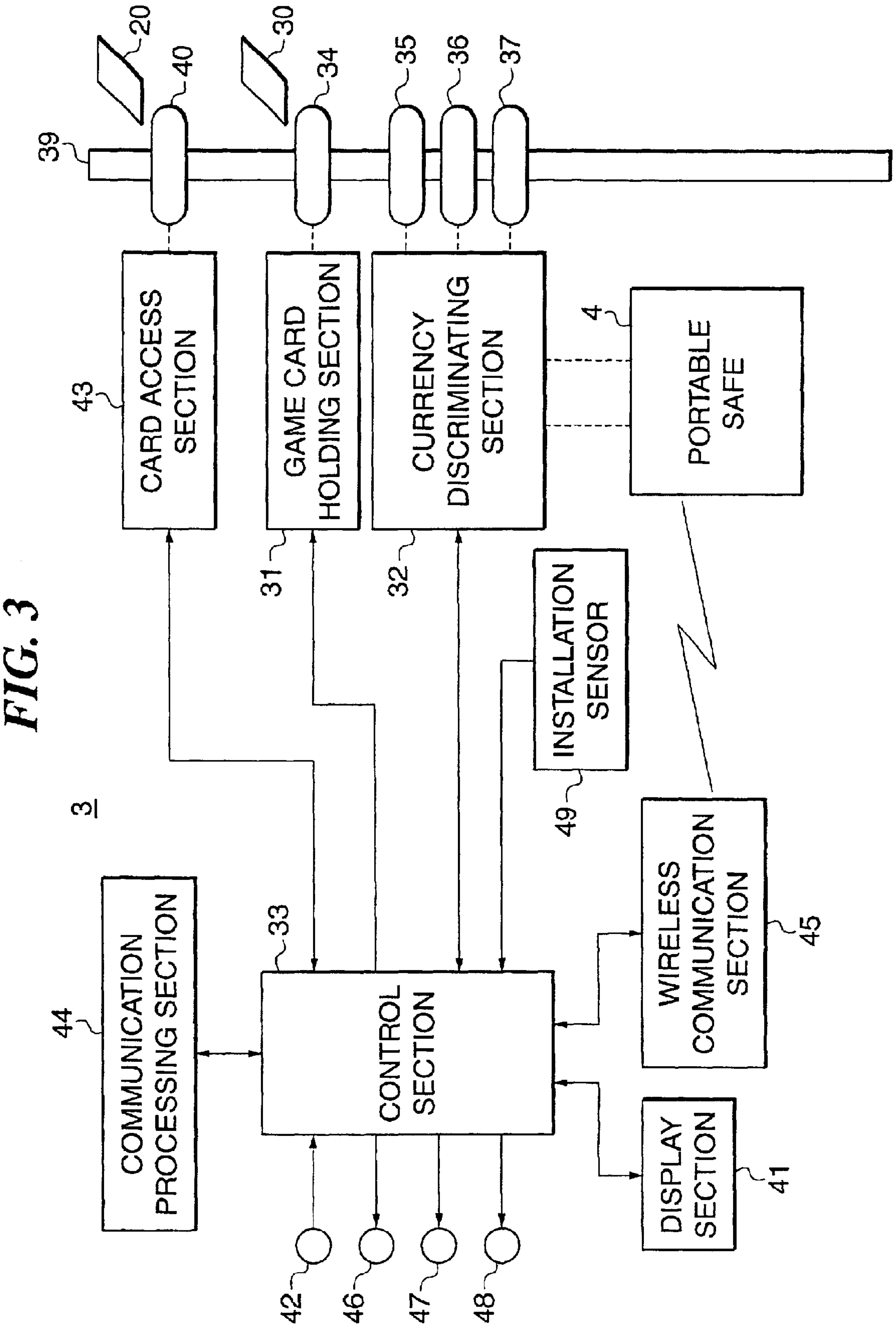
FIG. 3 is a functional block diagram of the embodiment showing the constitution of the game card vending machine.

FIG. 3 is an explanatory drawing of the functional constitution, in both electric and mechanical, of the game card vending machine 3.

Also the game card vending machine 3 is, while its perspective view is omitted, of a box shape and is placed for example on a floor or the like.

In the interior of the game card vending machine 3 are provided: a game card storage section 31 and a currency discriminating section 32, as well as a space for installing the portable safe 4. Incidentally, FIG. 3 is shown in the state of the portable safe 4 installed in the internal space.

The game card storage section 31 stores game cards 30, rolls out the stored cards 30 one by one under the control of a control section 33, and discharges it out of a game card outlet 34.

Incidentally, the game cards 30 in this embodiment are assumed to be prepaid cards. The game card 30 comes in plural denominations (such as 1000 Yen, . . . , 5000 Yen, and 10000 Yen). The card 30 rolled out is of the denomination specified by the player (as a matter of course, the amount of money is already deposited).

The game card 30 may be in other form as a matter of course. For example, it may be arranged as follows: No monetary information for enabling dispensing game balls is recorded but a card ID only is recorded on the game card 30 itself. A deposit amount information is transmitted to the system control computer 7. When the game card 7 is inserted into a pachinko ball dispensing machine (not shown) and pachinko balls are given out, monetary information in the system control computer 7 is deducted.

The currency discriminating section 32 is interposed in the currency transfer passage between the portable safe 4 and a bill port 35, a coin inlet 36, and coin dispensing port 37 to count the number and check the authenticity of bills and coins inserted or dispensed out. In case fake bills or coins are detected, or the amount of inserted currency is counted, the result is notified to a control section 33.

The bill port 35 is a port through which bills for purchasing the game card 30 are inserted, or through which the change bills are given back when the amount used with the game card 30 is smaller than the deposited amount, under the control of the control section 33. Incidentally, a bill insertion port and a bill dispensing port may be separately provided.

The coin inlet 36 is an inlet through which coins required to purchase the game card 30 are inserted. The coin dispensing port 37 is a port through which the change coins are given back when the price of the game card 30 is lower than the inserted amount of coins under the control of the control section 33.

Incidentally, in case the denominations of the game card 30 are those of bills only, the game card vending machine 3 may be made to handle only bills. In that case, the portable safe 4 and the currency discriminating section 32 also handle bills only, so that the coin inlet 36 and the coin dispensing port 37 may be omitted.

The constitution of the portable safe 4 will be described later. As described above, the game card vending machine 3 has the space for installing the portable safe 4. It is arranged so that, when the portable safe 4 is installed, a safe installation sensor 49 notifies the fact to the control section 33. The control section 33, as will be described later for its operation, sets the portable safe 4 to a state capable of receiving and giving out currency. While the portable safe 4 has a built-in power supply for a security mechanism which will be described later, it is arranged so that power supply (not shown in FIG. 3) for operating other mechanisms comes from the game card vending machine 3 when the portable safe 4 is installed.

The door 39 of the game card vending machine 3 covers the entire internal space including the space for installing the portable safe 4. The door 39 has a lock mechanism (not shown in FIG. 3) controlled electromagnetically or otherwise electrically to be locked and unlocked under the control of the control section 33.

The door 39 has the bill port 35, the coin inlet 36, and the coin dispensing port 37 as described above, and further has a card port 40, a display section 41, and plural buttons 42 for specifying the amount of money, while the positions of those components are not described specifically in FIG. 3.

The card slot 40 is an opening through which the operators' cards 20 carried by employees are inserted and taken out. The operator's card 20 inserted through the card slot 40 is transferred up to a card access section 43. The card access section 43 is to read information stored on the operator's card 20 and give the information to the control section 33, and store information given from the control section 33 onto the operator's card 20. In the above arrangement too, for example the control section 33 uses the information read from the operator's card 20 as a condition of determining unlocking the door 39. The control section 33 also causes the operator's card 20 to store the history of operation made to the game card vending machine 3.

The display section 41 is to display guidance message to prompt operation or to display information on the state of the game card vending machine 3.

The money amount specifying buttons 42 are used to specify the denomination and type of the game card 30 to be given out.

The game card vending machine 3 also has a communication processing section 44 which performs communication through the dedicated line N with other devices such as the cash control machine 2 and the system control computer 7 under the control of the control section 33.

The game card vending machine 3 also has a wireless communication section 45 through which information is exchanged between the portable safe 4 and the control section 33.

The control section 33 may be for example a microcomputer to control the entire game card vending machine 3. Details of the control operation will be described later.

In addition to the above, the game card vending machine 3 also has a buzzer 46 for notifying anomaly in the function or operation of the game card vending machine 3, an operator's card insertion lamp 47 for indicating the inserted state of the operator's card 20, a card discharge lamp 48 for indicating the state of issuance of the game card 20, and an installation sensor 49 for indicating the portable safe 4 being installed in the game card vending machine 3. Other buttons and lamps, although not shown, may be provided: a cancel button for canceling current process state, an employee paging button for paging an employee, a bill deposit lamp controlled to light up when bills are put in or dispensed, and a coin dispensing lamp controlled to light up when coins are put in or dispensed.

(A-1-3) Portable Safe 4.

The portable safe 4 is a safe for use to move cash (currency) between the cash control machine 2 and the game card vending machine 3. The portable safe 4 is also serves as a currency storage section of the game card vending machine 3 when it is installed in the game card vending machine 3.

Figure 4:
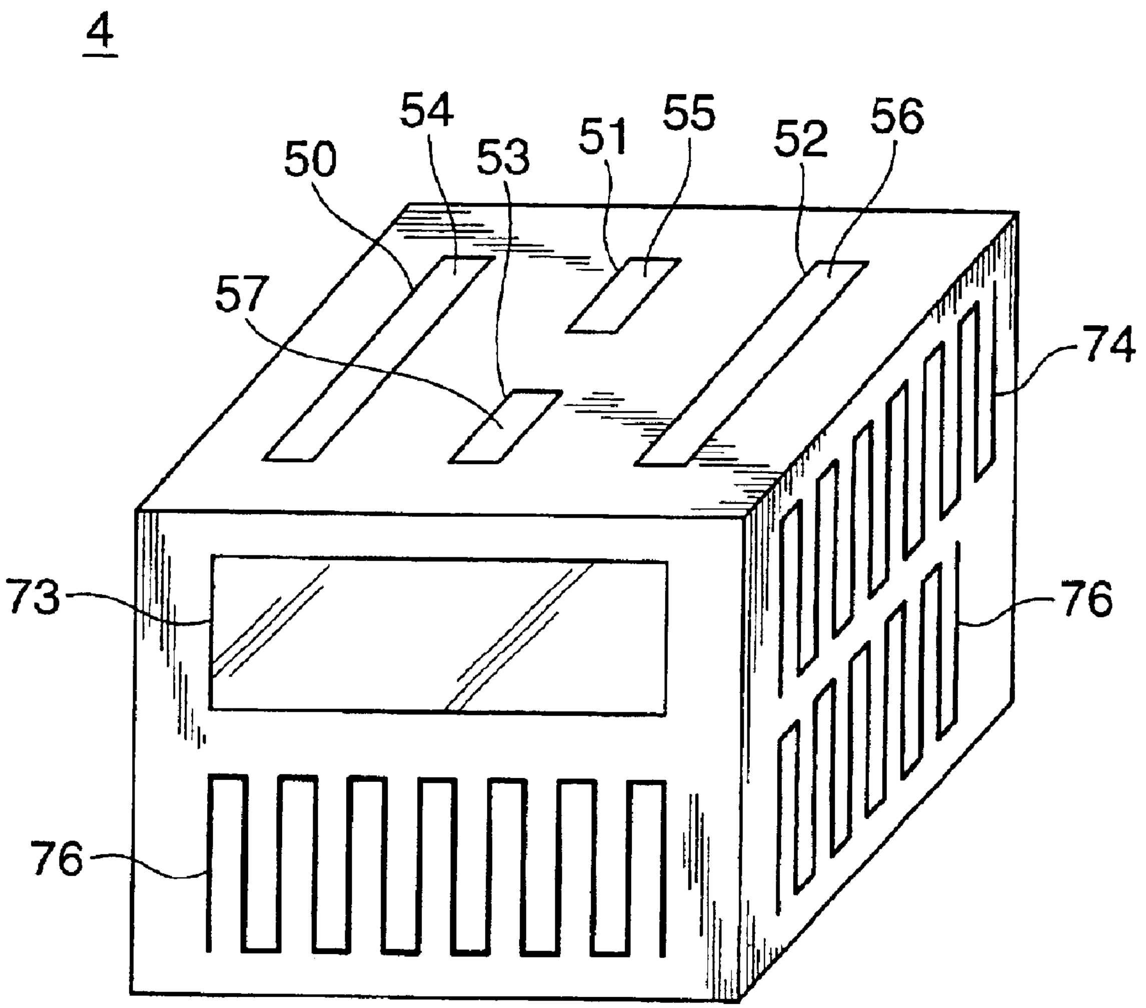
FIG. 4 is a simplified perspective view of the portable safe of the embodiment.
Figure 5:
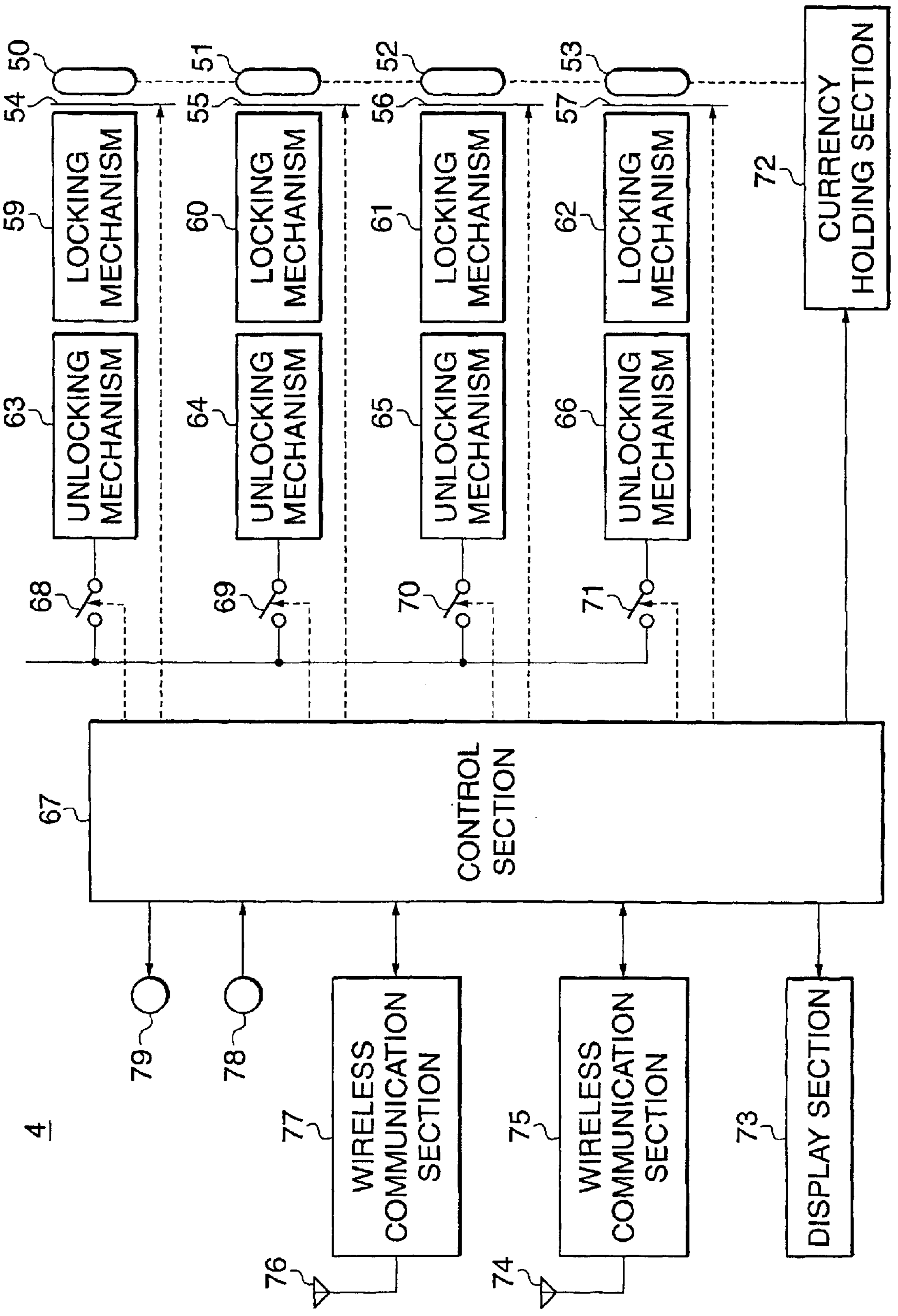
FIG. 5 is a functional block diagram of the embodiment showing the constitution of the portable safe.

FIG. 4 is a simplified perspective view of the portable safe 4. FIG. 5 is for explaining the functional constitution of the portable safe 4. It shows not only an electrical functional constitution but also a mechanical one.

In FIGS. 4 and 5, the portable safe 4 is of a box-like shape. The portable safe 4, on its top surface for example, is provided with a window section 50 for inserting bills, a window section 51 for inserting coins, a window section 52 for dispensing bills, and a window section 53 for dispensing coins. Those window sections 50 to 53 are made to be capable of being closed from inside the box by means of respectively corresponding shutter plates 54 to 57. The shutter plates 54 to 57 are capable of opening and closing the corresponding window sections 50 to 53 by movements such as rotation, swing, or slide. In the state of the shutter plates 54 to 57 closing the corresponding window sections 50–53, lock mechanisms 59 to 62 are effective so that the shutters cannot be opened by operation from outside.

The lock mechanisms 59 to 62 may be unlocked, namely the window sections 50 to 53 may be opened, only with unlocking means 63 to 66 such as electro-magnetic solenoids. Power to the unlocking means 63 to 66 is supplied from the cash control machine 2 or from the game card vending machine 3 when the portable safe 4 is installed in the cash control machine 2 or the game card vending machine 3. On the lines for the power supply are provided switches 68 to 71 controlled to open and close with a control section 67.

A currency storage section 72 is divided into subsections to store respective denominations of currency. Power supplied from the cash control machine 2 or from the game card vending machine 3 also serves to drive the transfer of currency on the currency transfer passages (including transfer rollers (not shown)) between the currency storage section 72 and the window sections 50 to 53 as described later.

The portable safe 4 has, for example on its surface, a display section 73. The display section 73 displays for example the ID of the game card vending machine 3 to which the portable safe 4 is to be or has been installed or the ID of the operator (employee) who is carrying the portable safe 4 at least during the period in which the portable safe 4 is taken out of either of the cash control machine 2 and the game card vending machine 3 and installed in the other. Incidentally, it may also be arranged to display the numbers of respective denominations of money during the transport or installation into the device.

One surface of the portable safe 4, which faces the antenna of the wireless communication section 23 of the cash control machine 2 or the wireless communication section 45 of the game card vending machine 3 when the portable safe 4 is installed in the cash control machine 2 or the game card vending machine 3, is provided with a communication antenna 74 such as a flat-shape antenna. The communication antenna 74 is connected to a wireless communication section 75 which is connected to a control section 67. The wireless communication section 75 is to exchange information with the cash control machine 2 or the game card vending machine 3 under the control of the control section 67.

Also, antennas 76 for security are provided on plural sides of the portable safe 4 and connected to a wireless communication section 77 which is connected to the control section 67. The security antennas (sending and receiving antennas) 76 are to exchange radio waves with the security purpose wireless machine 6.

The security purpose wireless machine 6 will be described later in detail. Roughly speaking here, the security purpose wireless machine 6 is installed in a relevant position on the ceiling of the hall of the game facility.

The security purpose wireless machine 6 has a signal sending function for detecting the absolute or relative position or distance of the portable safe 4.

For example, if one unit of the security purpose wireless machine 6 is provided and its transmission power is fixed, power received with the security antenna 76 of the portable safe 4 changes according to the distance between the security purpose wireless machine 6 and the portable safe 4. Therefore, the control section 67 can detect the distance on the basis of the power received with the wireless communication section 77. In another example, if the (three) security purpose wireless machines 6 are provided in three of four corners of the game facility hall ceiling to transmit signals of time information, the control section 67 can detect the absolute position of the portable safe 4 in the game facility hall (also outside the hall if the transmitted power is high enough) along a hyperbolic curve based on the time information of the security purpose wireless machine 6 obtained by demodulation with the wireless communication section 77 of the portable safe 4. The following description assumes that the security purpose wireless machine 6 is related to the latter arrangement.

The wireless communication section 77 of the portable safe 4 receives and demodulates signals, obtains information from which the distance or the absolute or relative position of the portable safe 4 can be detected, and sends the information to the control section 67.

The security purpose wireless machine 6 has a signal receiving function to take warning information on possible theft or the like from the portable safe 4 and transmit it to the system control computer 7.

The wireless communication section 77 of the portable safe 4 demodulates warning information given from the control section 67 and transmits the information from a security antenna 76.

The portable safe 4 also has other security function components such as an anomaly sensor 78 and a buzzer 79.

The anomaly sensor 78 is an impact sensor or tilt sensor to detect and notify to the control section 67 such anomalies as the impact occurring as when someone attempts to destroy the portable safe 4 or a tilt of such an extent that is inconceivable in normal transport of the portable safe 4 for example, turning the portable safe 4 upside-down.

The buzzer 79 is to produce sound for preventing crimes such as theft, destruction or incorrect installation under the control of the control section 67.

The control section 67 is a microcomputer for example to control the entire portable safe 4. Details of the control will become clear later in the explanation of function. The control section 67 has a memory section and a timer installed therein. As for this embodiment, in the memory section are stored in addition to a processing program as appropriate: the numbers by the denomination of currency stored, the ID of the portable safe 4, information on the time at which the installed portable safe 4 is removed from the cash control machine 2 or the game card vending machine 3 (to be cleared when reinstalled), and the ID of the game card vending machine 3 in which the portable safe 4 is to be or has been installed.

The portable safe 4 is also provided with a battery (not shown). The portable safe 4, when installed in the cash control machine 2 or the game card vending machine 3, operates with the power supply from the cash control machine 2 or the game card vending machine 3. When it is removed from the cash control machine 2 or the game card vending machine 3, it works with the built-in battery. The power of the built-in battery is supplied to those components which function only when the safe 4 is removed from the cash control machine 2 or the game card vending machine 3.

Here, in order not to impair the closed nature of the portable battery, the built-in battery is preferably a secondary battery. Alternatively it may be arranged so that the battery is installed in a space different from that for other components to permit changing the battery.

Incidentally, although not shown, it is possible to detect whether or not the portable safe 4 is installed in the cash control machine 2 or the game card vending machine 3 according to whether or not power is supplied from the cash control machine 2 or the game card vending machine 3 through a power connection terminal. Here, the cash control machine 2 or game card vending machine 3 in which the portable safe 4 is installed is recognized by wireless exchange of information.

(A-1-4) Operator's Card Device 5.

The operator's card device 5 is to issue operator's cards 20 to be carried by the employees who can be the operators of the cash control machine 2 or the game card vending machine 3 or to retrieve the issued operator's cards 20, and also has the function of a time recorder. Issuing the operator's card is done at the time the employee comes to the work place and the retrieval is made when the employee leaves the work place.

Figure 6:
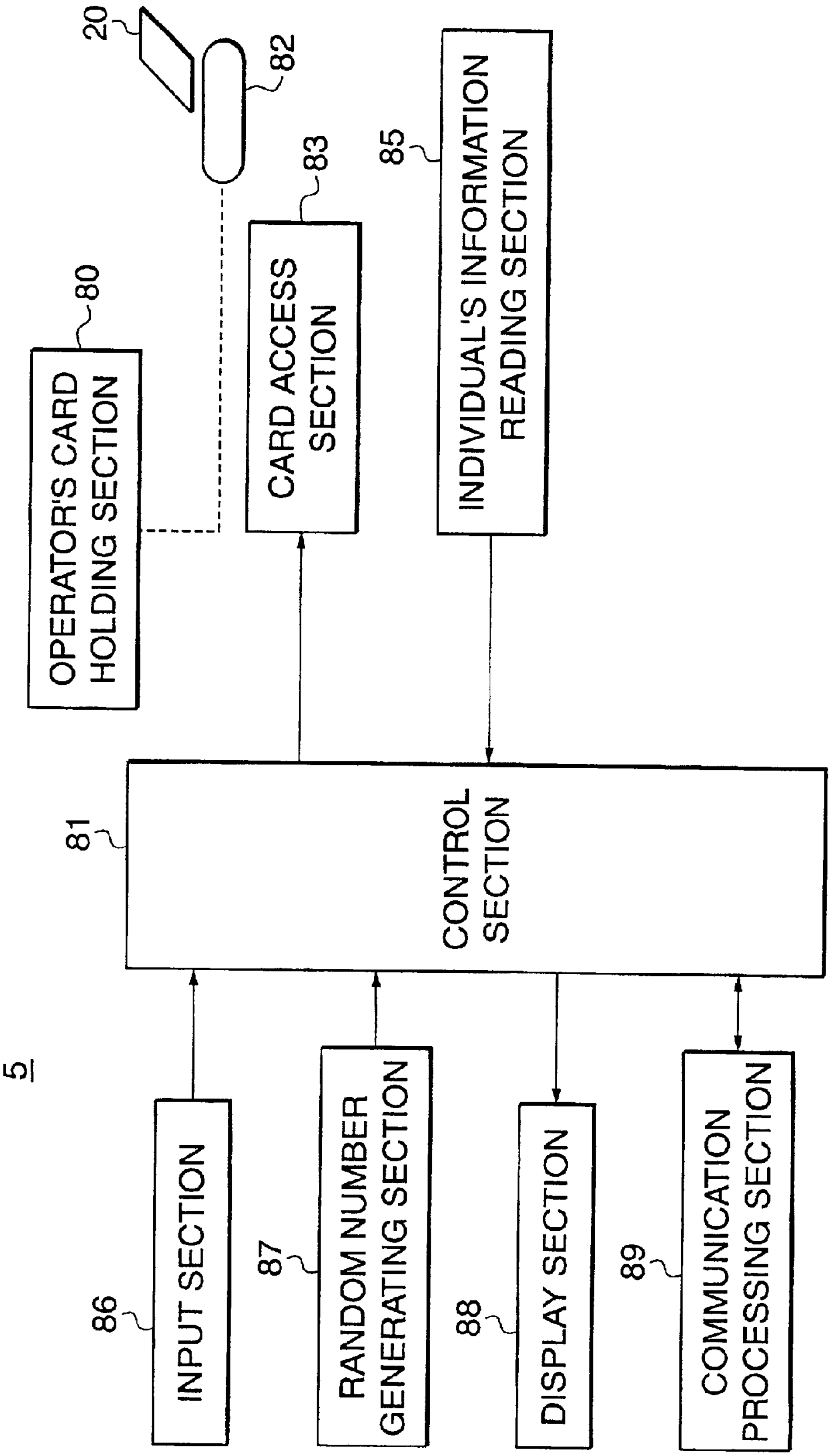
FIG. 6 is a functional block diagram of the embodiment showing the constitution of the operator's card device (employee's card device)

FIG. 6 is for explaining the functional constitution of the operator's card device 5. It shows not only an electrical functional constitution but also a mechanical one.

The operator's card device 5 has an operator's card holding section 80 for holding the operator's card 20. The operator's cardholding section 80 is to let out operator's cards 20 held therein and receive operator's cards 20 inserted through a card slot 82 under the control of a control section 81.

An operator's card access section 83 is provided on the transfer passage of the operator's card 20 between the operator's card holding section 80 and the card slot 82. The operator's card access section 83 is to store information onto the operator's card 20 and to delete the information under the control of the control section 81. As for this embodiment, on the operator's card 20 held in the operator's card holding section 80, only the card ID is stored, and the employee's code is not stored. The operator's card access section 83 stores for example an employee's fixed code with a random number affixed onto an operator's card 20 being issued, and deletes the employee's fixed code together with the affixed random number from the operator's card 20 being retrieved.

The operator's card device 5 has an individual's information reading section 85 for identifying the employee.

The individual's information reading section 85 comprises for example a fingerprint reader, a palm print reader, or an iris reader to give the read information (information of the finger print, palm print or iris; image information) to the control section 81. Collation of the read individual's information with pre-registered information is performed with the control section 81 or the system control computer 7.

The operator's card device 5 has an input section 86, a random number generating section 87, a display section 88, and a communication processing section 89. A timer for counting time and date is assumed to be included in the control section 81.

The input section 86 is provided for example with plural keys for the operator to enter relevant information (for example employee's fixed code) into the operator's card device 5. The inputted information is given to the control section 81.

The random number generating section 87 generates random numbers under the control of the control section 81 and gives the generated random numbers to the control section 81. While each employee is provided with a fixed code, a random number is also generated when the employee comes to the work place and an operator's card (employee's card) 20 is issued, the employee's fixed code to which the random number is affixed is stored on the operator's card 20, so that the issued operator's card 20 has the employee's code (of that day) including the random number.

The display section 88 is to display guidance message of prompting the operator to operation and the information on the state of the operator's card device 5.

The communication processing section 89 is to perform communication with other devices such as the system control computer 7 through the dedicated line N under the control of the control section 81.

The control section 81 is made of for example a microcomputer to control the entire operator's card device 5. Details of the control will be made clear later in the explanation of the operation.

(A-1-5) Security Purpose Wireless Machine 6.

The security purpose wireless machine 6 is to exchange information with the portable safe 4 for preventing illegal actions such as theft, etc. to the portable safe 4.

Figure 7:
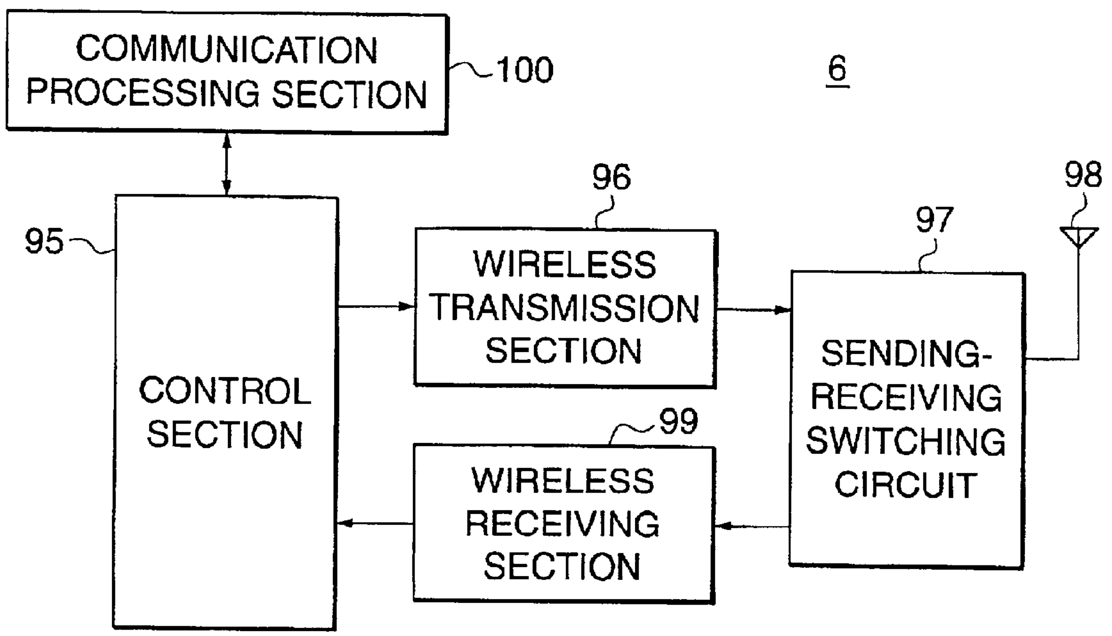
FIG. 7 is a functional block diagram of the embodiment showing the constitution of the security purpose wireless machine.

FIG. 7 is a block diagram of the functional constitution of the security purpose wireless machine 6. Operation of the security purpose wireless machine 6 will be described in the paragraphs of its constitution and function.

A control section 95 of the security purpose wireless machine 6 is made of for example a microcomputer to control the entire security purpose wireless machine 6.

The control section 95 gives to a wireless transmitting section 96 information including at least current time and the ID of the security purpose wireless machine 6 necessary for the portable safe 4 to detect its own position for example at 0.5 second intervals.

The wireless transmitting section 96 modulates (also filters and amplifies as appropriate) the given information into radio frequency band signals and gives the result to a common, sending-and-receiving antenna 98 through a sending-and-receiving switching circuit (so-called duplex circuit) 97 to be emitted in the air.

The reception signals obtained as the common, sending-and-receiving antenna 98 catches the radio waves are given to a wireless receiving section 99 through the sending-and-receiving switching circuit 97. The wireless receiving section 99 demodulates (also pre-amplifies and filters as appropriate) the reception signals given, and gives information sent from any portable safe 4 to a control section 95. The information sent from the portable safe 4 is security-related information, such as the information on the anomaly in the position, impact, or duration of non-installation of the portable safe 4.

The control section 95 organizes, when information is given from the wireless receiving section 99, portable safe anomaly information including the ID of the troubled portable safe 4 or the type of the trouble. A communication processing section 100 sends the information to the system control computer 7 through the dedicated line N.

(A-1-6) System Control Computer 7.

The system control computer 7 is made of a computer device having communicating function for example a personal computer, for the executives or the managers of the game facility to control the entire currency control system.

The system control computer 7 is to perform: cash control (currency control) including the numbers of the devices such as the cash control machines 2, the game card vending machines 3, the portable safes 4, the operator's card devices 5, and the security purpose wireless machines 6; the setting of parameters and the addresses of various devices on the communication network, and monitoring the above devices. The system control computer 7 is also connected to a conventional hall control computer (not shown) which controls the information on the discharge of game balls from the pachinko game machines 5 and on member cards. As a matter of course, the above systems may be incorporated in the system control computer 7.

Figure 8:
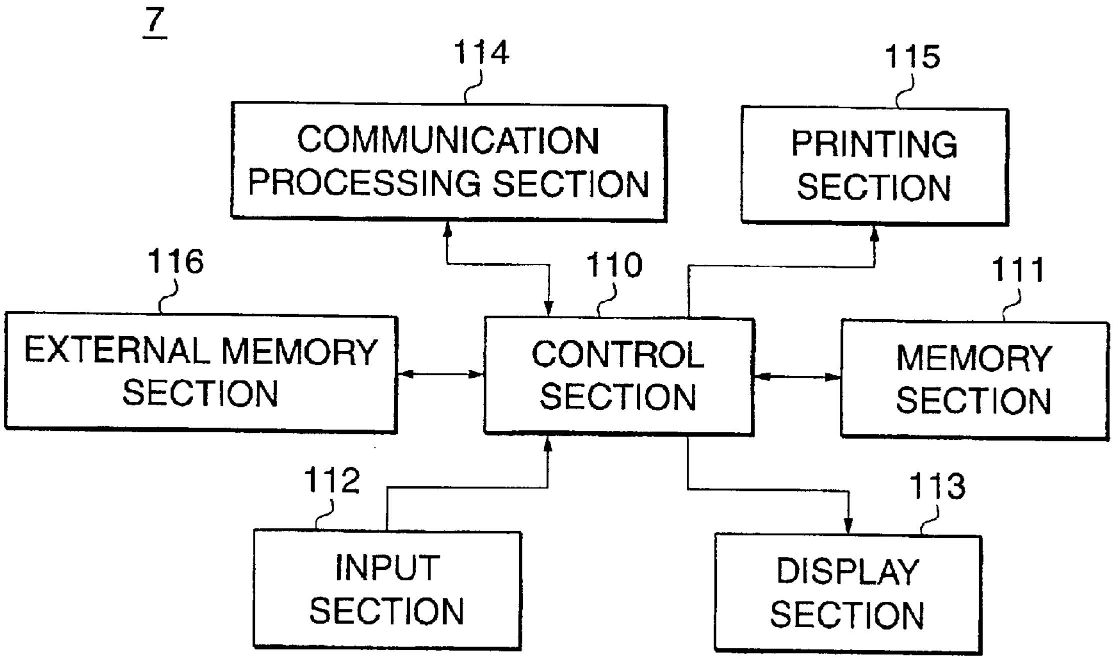
FIG. 8 is a functional block diagram of the embodiment showing the constitution of the system control computer.

As described above, the system control computer 7 is made of the computer device, and comprises, as shown in FIG. 8, a control section 110, a memory section 111, an input (entry) section 112, a display section 113, a communication processing section 114, a printing section 115, and an external memory section 116.

Here, in either of the memory section 111 and the external memory section 116 are stored and appropriately updated various pieces of information on the total amount of money in the game facility, numbers by the denomination of currency, and the numbers by the denomination of currency in each of devices (cash control machines 2 and portable safes 4). The information may be stored in both of the memory section 111 and the external memory section 116.

Incidentally, the subject of description of this embodiment is a game facility having only the pachinko game machines played with the pachinko balls dispensed by the use of the game card 30. In case of the devices located between pachinko game machines, the so-called sandwiched devices, that issue the pachinko ball vending command in exchange for receiving cash (bills and coins), it may be arranged so that the cash information in the sandwiched device is communicated to the system control computer 7, or that the portable safe 4 is also applied to the sandwiched device. Here, the portable safe 4 corresponding to the sandwiched device may or may not be the same in shape as the one corresponding to the game card vending machine 3. In case of a different shape, it may be arranged so that a single cash control machine 2 has an internal structure capable of coping with two portable safes 4 of different shapes, or that separate cash control machines 2 may be provided, with one for receiving the portable safe 4 corresponding to the sandwiched device and the other for receiving the portable safe 4 corresponding to the game card vending machine 3.

While details are omitted, in either of the memory section 111 and the external memory section 116 are stored; information on the operator's card 20 and employees, information on the state of the installation and transport of the portable safe 4, information on the device to which the portable safe 4 is installed, and information on operation history of various devices. The information may be stored in both of the memory section 111 and the external memory section 116.

The following description on functions also covers the information stored in the memory section 111 and/or the external memory section 116.

(A-2) Operation of the Embodiment.

Next, the operation of the currency control system constituted as described above as an embodiment will be described. The following description is made about the operation related to the cash control in a pachinko game facility along a day's flow of time. In the following description, process of actions of lighting up, blinking of lamps and putting off lamps indicating the state of insertion of cards and currency in various devices is omitted.

(A-2-1) Operation When Employees Come to the Work Place.

Figure 9:
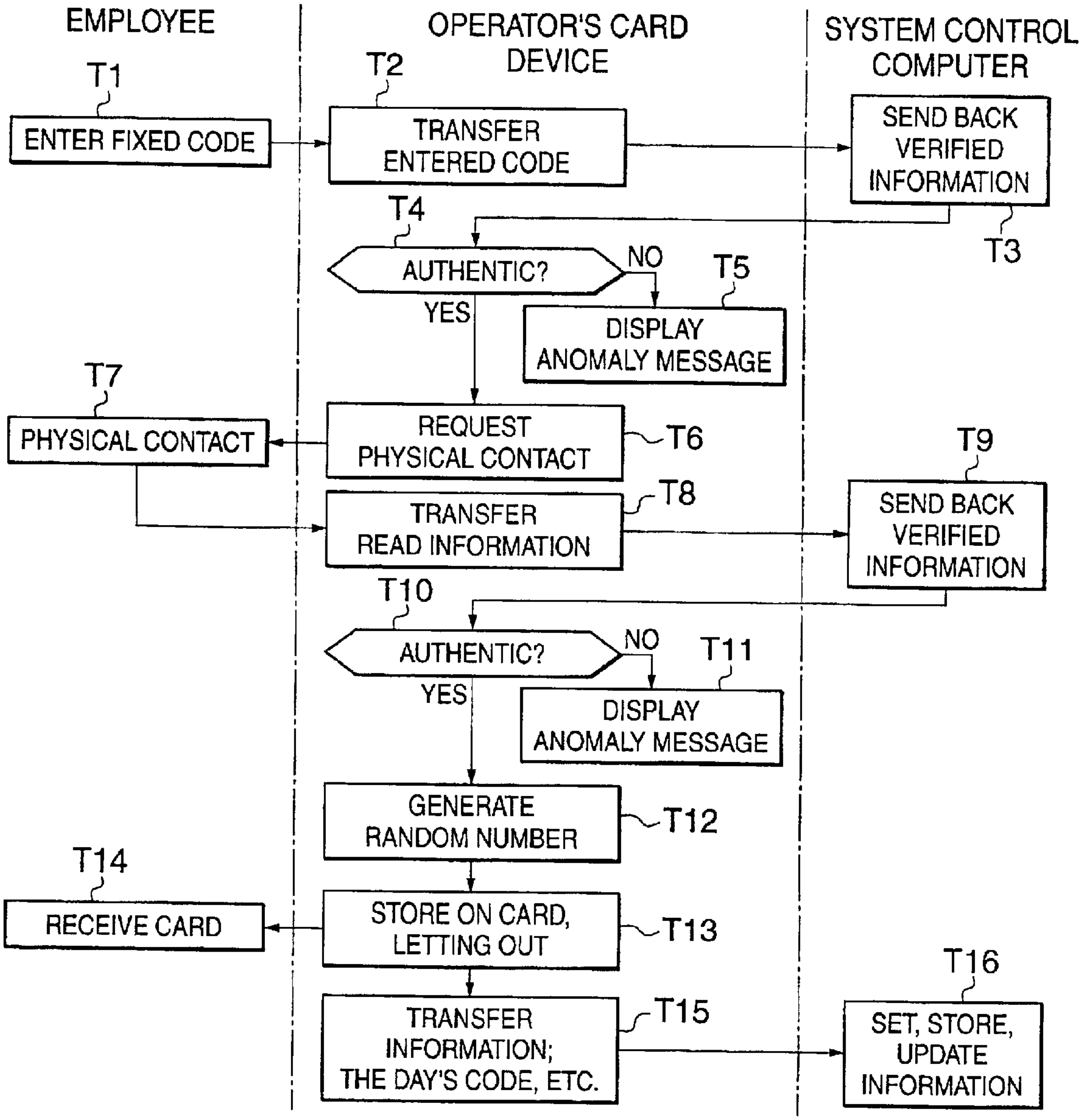
FIG. 9 is a sequence diagram of the embodiment showing the operation when an employee comes to the place of work.

First, the operation when an employee comes to the work place is described in reference to the sequence shown in FIG. 9.

The control section 81 of the operator's card device 5 in its standby state causes the display section 88 to display a message requesting the entry of the employee's fixed code. The employee, upon coming to the work place, uses the input section 86 to enter his or her own, employee's fixed code (T1).

The control section 81 communicates with the system control computer 7 through the communication processing section 89 to verify the authenticity of the employee's fixed code (T2 to T4).

When the entered employee's fixed code is not authentic, the control section 81 causes the display section 88 to display an anomaly message and returns to the standby state (T5).

On the other hand, when the entered employee's fixed code is authentic, the control section 81 causes the display section 88 to display a message prompting the employee to bring a relevant part of his or her body into contact with or to the vicinity of the individual's information reading section (fingerprint reading device) 85 (T6). In this way, the employee has the image of his or her relevant body part read with the individual's information reading section 85. The control section 81 communicates with the system control computer 7 through the communication processing section 89 to verify that the read image information corresponds to the employee's fixed code (T7 to T10).

In case the image data obtained is inappropriate, the control section 81 causes the display section 88 to display an anomaly message followed by a standby state display (T11).

On the other hand, if the image data is authentic, the control section 81 causes the random number generating section 87 to generate a random number and simultaneously takes the current time data (work attendance time data) from the built-in timer (T12).

And the control section 81 causes the following steps: The operator's card holding section 80 rolls out a piece of the operator's card 20. The operator's card access section 83 reads the ID of the operator's card 20 being let out. The operator's card access section 83 stores on the operator's card 20 being let out the employee's code of the day made up of the employee's fixed code with the generated random number being affixed and the work attendance time. The operator's card 20 is let out through the card slot 82. Then the employee receives the operator's card 20 (T13, T14).

Also, the control section 81 transfers to the system control computer 7 and store there: the card ID, the employee's code of the day made up of the employee's fixed code with the generated random number affixed, and the work attendance time, of the operator's card 20 rolled out (T15, T16). After that, the control section 81 brings back the display to the standby state. The employee's code of the day and the card ID of the operator's card 20, as paired pieces of information, are stored on the system control computer 7 side.

(A-2-2) Putting Money Into Portable Safe 4 Before Business Hours of the Day.

Figure 10A:
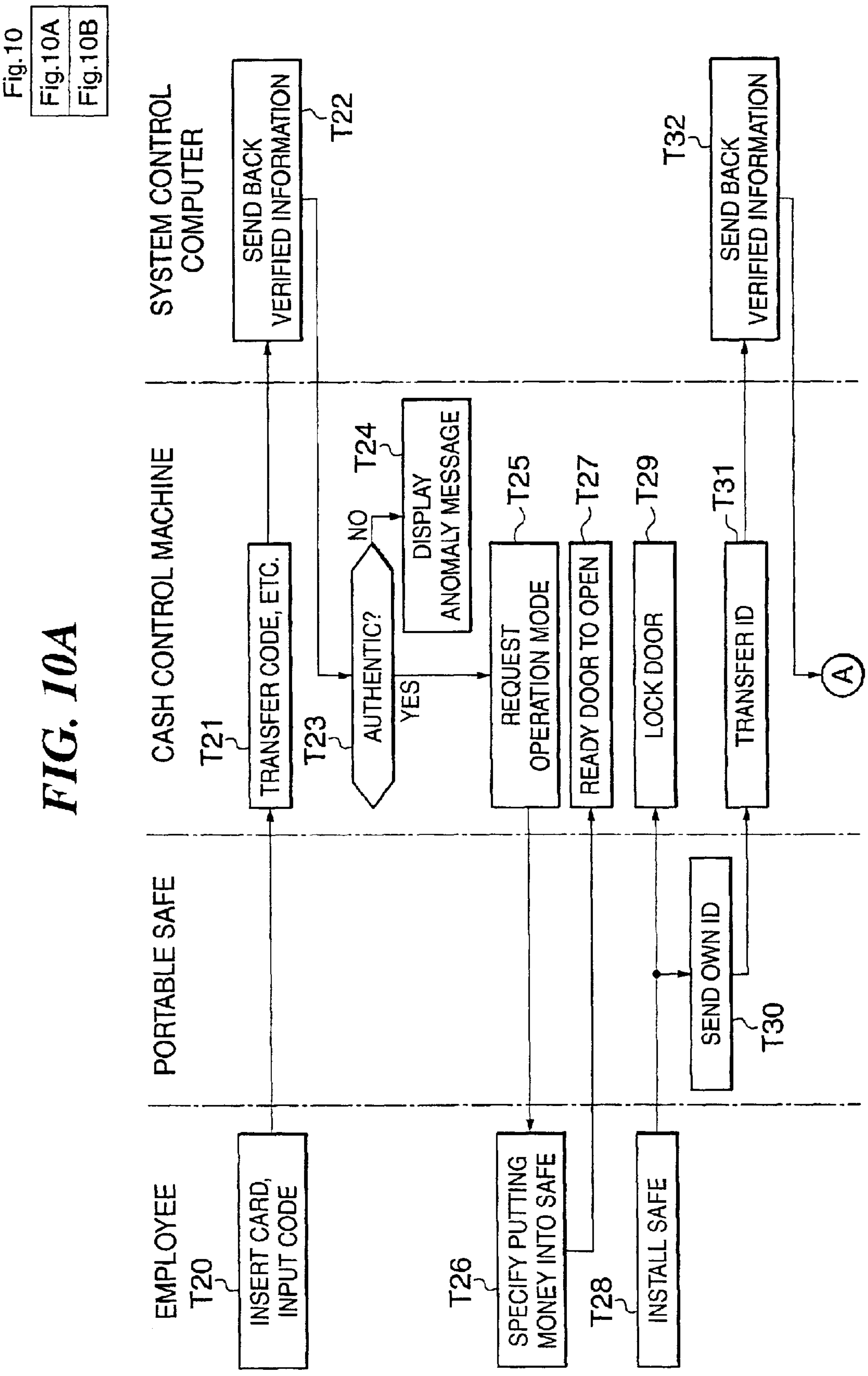
FIG. 10 is a sequence diagram (1) of the embodiment showing the operation of putting money into the portable safe before the business hours.
Figure 10B:
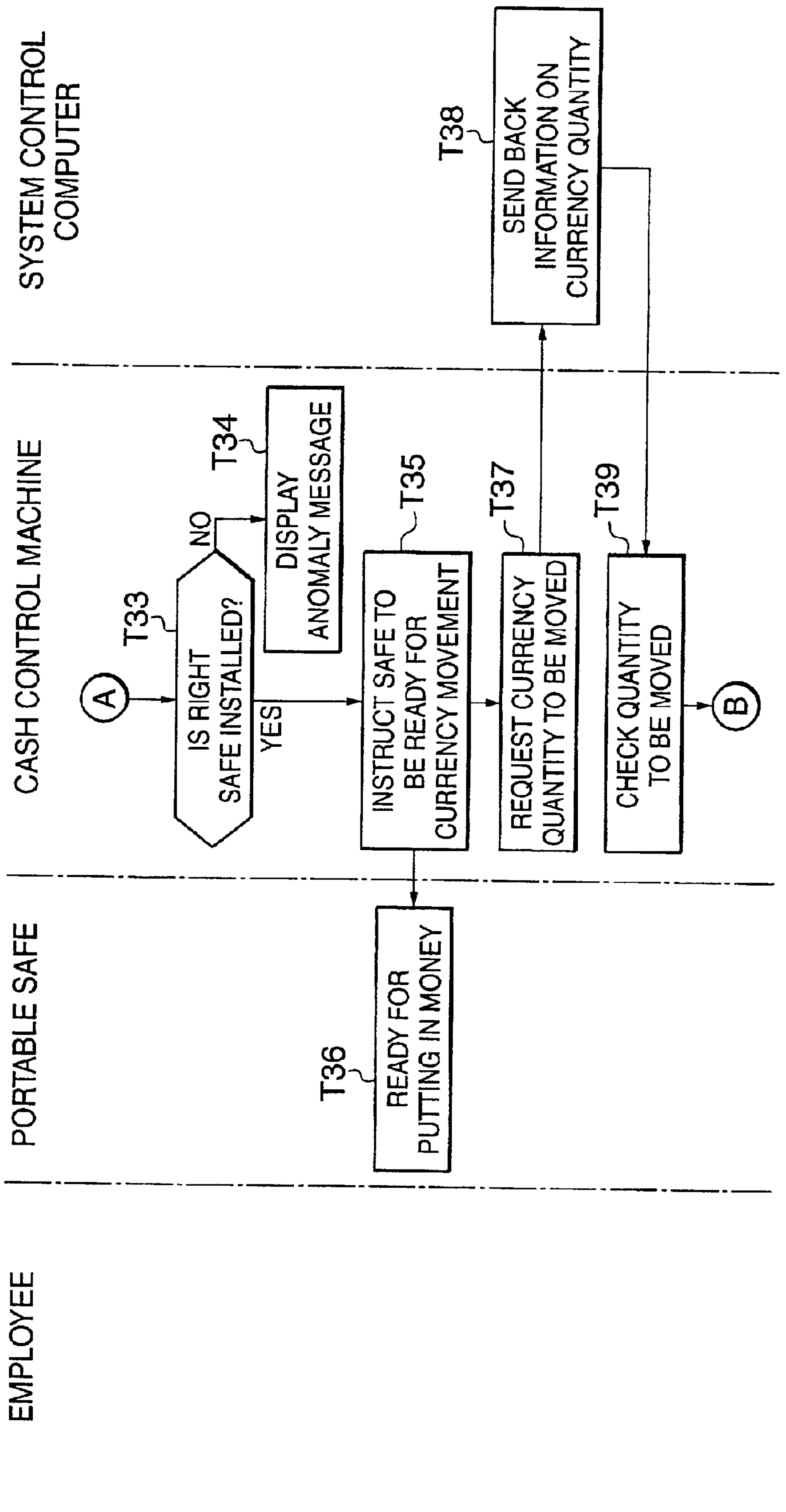
Figure 11:
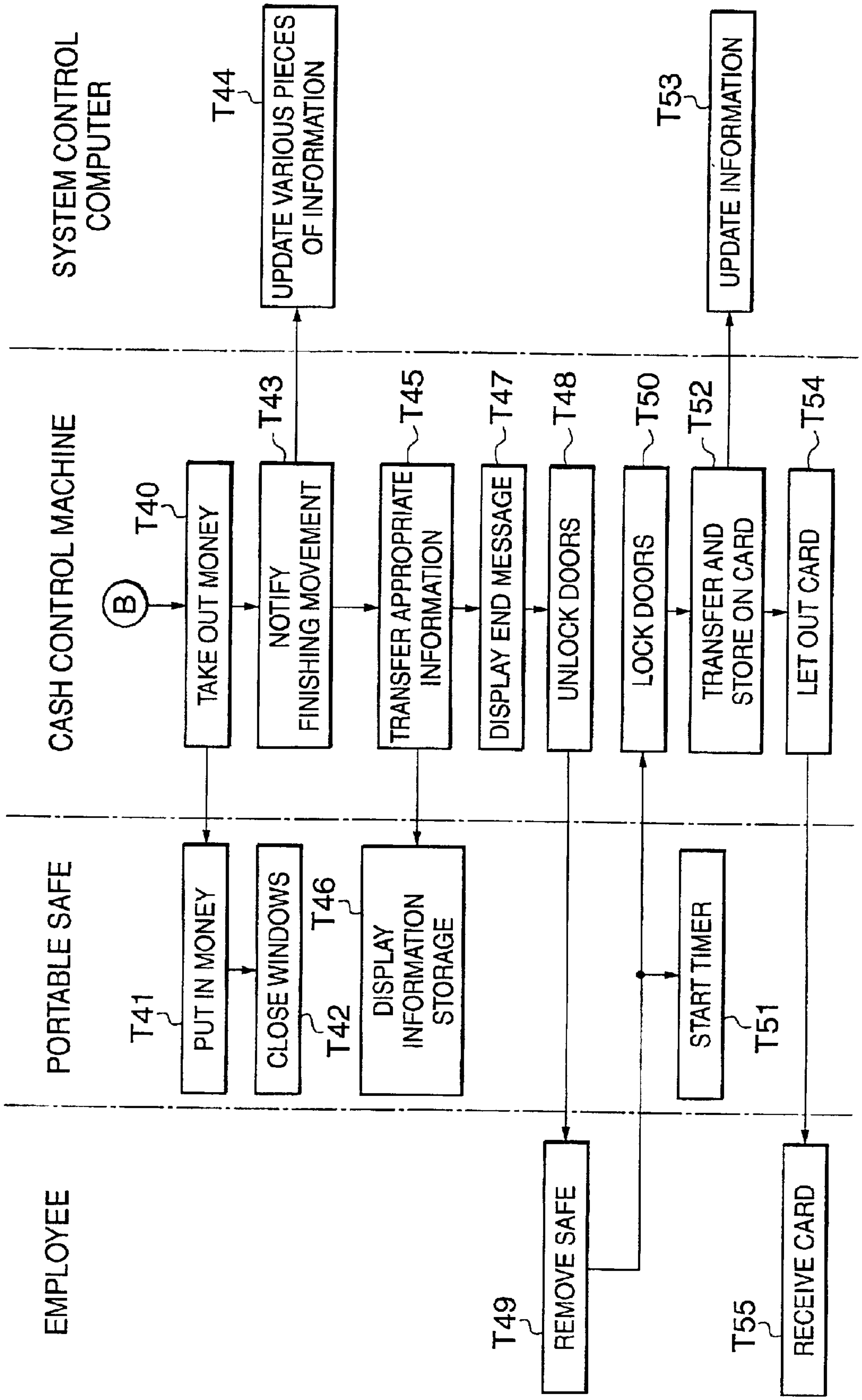
FIG. 11 is a sequence diagram (2) of the embodiment showing the operation of putting money into the portable safe before the business hours.

Next, the operation of putting money (operation of putting currency) into the portable safe 4 before starting business of the day will be described below in reference to the sequence diagrams shown in FIGS. 10 and 11.

Putting currency into an empty portable safe 4 before the business hours of the day is done by an employee (or a manager of the business, or a person in charge of operating the facility) who has finished business starting procedure and obtained an operator's card 20. The employee carries the empty portable safe 4 to the place where the cash control machine 2 is placed. An empty portable safe 4 may be stored either in a storage-dedicated place or may be installed and stored in the game card vending machine 3.

The control section 12 of the cash control machine 2, in its standby state, displays on the display section 19 a message prompting an operator to insert an operator's card 20 and to enter the operator's code (here, the operator's fixed code). The employee (operator) inserts the operator's card 20 into the card slot 17 and uses the input section 18 to enter his or her own employee's fixed code (T20). Information stored on the operator's card 20 inserted is read with the card access section 21.

At this time, the control section 12 communicates with the system computer 7 through the communication processing section 22 to verify if the employee's fixed code entered is authentic and if the operator's card 20 inserted is also authentic (T21 to T23). The inserted operator's card 20 is deemed to be authentic if, for example, the card ID of the operator's card 20 of the operator, the employee's fixed code (also on condition of agreement with the entered employee's fixed code), the employee's code of the day together with a random number generated and affixed, and the work attendance time are in agreement with those registered in the system control computer 7. Incidentally, if the operation of the cash control machine 2 is permitted only to specified employees, the information stored on the operator's card 20, which is in agreement with the registered information but is that of an employee other than the specified employees, is not determined to be authentic.

In case the entered employee's fixed code or the operator's card 20 inserted is not authentic, the control section 12 causes the display section 19 to display an anomaly message and causes the buzzer 24 to sound (T24).

On the other hand, in case the entered employee's fixed code and the operator's 20 card inserted are authentic, the control section 12 causes the display section 19 to display a message requesting to specify an operation mode (T25).

In response to the above, the employee enters a message of the mode of pre-business hours money entry into the portable safe 4 through the input section 18. At this time, the control section 12 unlocks only the outer door 15 (T26, T27).

The employee opens the door 15, installs the portable safe 4 in the cash control machine 2, and closes the door 15. As a result, a closure signal from a sensor (not shown) of the door 15 is given to the control section 12, and the control section 12 causes the door 15 to lock (T28, T29).

The control section 67 of the portable safe 4 installed in the cash control machine 2 recognizes the installation by power supply from outside, and gives the ID of the portable safe 4 through the wireless communicating section 75 to the cash control machine 2. The control section 12 of the cash control machine 2, upon receiving the ID of the portable safe 4 through the wireless communicating section 23, communicates with the system control computer 7 through the communication processing section 22 to verify the authenticity of the installed portable safe 4 (T30 to T33). The authenticity is denied when for example the ID of the installed portable safe 4 is not registered in the system control computer 7, or when the ID of the installed portable safe 4 coincides with the ID of a portable safe 4 in which currency is already held.

In case the installed portable safe 4 is not authentic, the control section 12 causes the display section 19 to display an anomaly message and causes the buzzer 24 to sound (T34).

In contrast, in case the portable safe 4 installed is authentic, the control section 12 gives an instruction through the wireless communicating section 23 to open the windows 50 and 51 (to move the shutter plates 54 and 55) which serve as openings for inserting currency into the portable safe 4. The control section 67 of the portable safe 4 which has received the instruction through the wireless communicating section 75 causes the windows 50 and 51 to open (T35, T36).

The control section 12 of the cash control machine 2 communicates with the system control computer 7 through the communication processing section 22 to take in the ID of the game card vending machine 3 in which the portable safe 4 remains installed during the business hours and the numbers by the denomination of currency stored in the portable safe 4 (T37 to T39). A specific game card vending machine 3 in which the portable safe 4 is to remain installed during the business hours is determined for example to be the one having the smallest ID number out of those for which no portable safe 4 to be installed has been determined yet.

In case each portable safe 4 corresponds one to one to each game card vending machine 3, taking in the game card ID or determining the specific game card vending machine 3 may be omitted. Also, in place of or in addition to pre-registering in the system control computer 7 the numbers by the denomination of currency to be stored in the portable safe 4, the numbers may be specified by the employee using the input section 18.

Thus, currency is transferred under the control of both of the control sections 12 and 67 from the fixed safe 10 of the cash control machine 2 through the currency counting section 11 to the currency holding section 72 of the portable safe 4 (T40, T41).

When the transfer of currency in the specified numbers by the denomination is completed, the control section 67 of the portable safe 4 closes the windows 50 and 51 which have been open (to bring back and lock the shutter plates 54 and 55 into the original position) (T42).

On the other hand, the control section 12 of the cash control machine 2 notifies, when the transfer of currency in specified numbers by the denomination is completed, the fact to the system control computer 7 through the communication processing section 22. The system control computer 7 sets and stores various pieces of information such as information on the state of the portable safe 4 (T43, T44). For example, it sets the state information to the holding state of currency, stores the data of the numbers, matches the portable safe 4 with a game card vending machine 3 in which the portable safe 4 is installed, matches the portable safe 4 with the employee, updates the numbers in the cash control machine 2, and sets the numbers to be held in the portable safe 4.

Furthermore, the control section 12 of the cash control machine 2 by wireless communication gives specified information to the control section 67 of the portable safe 4. The control section 67 of the portable safe 4 stores the relevant information in a built-in memory section and causes the display section 73 to display the relevant information (T45, T46). For example, the stored information includes the numbers by the denomination of currency being stored and the ID of the game card vending machine 3 in which the portable safe 4 is installed, and the displayed information includes the ID of the game card vending machine 3, the code of the operator (employee) who carries the portable safe 4, and the numbers by the denomination of currency.

The control section 12 of the cash control machine 2 displays the message meaning that storing the currency in the portable safe 4 is completed, and unlocks only the outer door 15 (T47, T48).

As the employee opens the door 15, removes the portable safe 4 from the cash control machine 2, and closes the door 15, a closure signal from the sensor (not shown) of the door 15 is sent to the control section 12, and the control section 12 locks the door 15 (T49, T50).

The control section 67 of the portable safe 4 recognizes the removal as the power supply from outside is stopped, and stores in its inside the removal time data, and starts security operation including starting a monitor timer (T51). This process will be detailed in the following paragraphs about transport operation.

As the door 15 is locked, the control section 12 of the cash control machine 2 causes the card access section 21 to store the operation history of this time onto the operator's card 20, to store also the operation history in the built-in memory section, and further to transfer the operation history to the system control computer 7 to store it there (T52, T53).

And the control section 12 causes the operator's card 20 to be let out through the card port 17, and returns to the standby state waiting for various operations. And the employee receives the operator's card 20 (T54, T55).

Incidentally, the above description is about the operation of putting money into the portable safe 4 before the start of the day's business hours. Since the operation of replenishing money during the business hours is done like the above, its description is omitted.

(A-2-3) Operation in Transport of the Portable Safe 4.

Next, the operation in transport (security monitoring operation) of the portable safe 4 will be described in reference to the flowchart shown in FIG. 12.

The portable safe 4 is transported up to a specified game card vending machine 3 before the business hours after currency is put into with the cash control machine 2, and after the business hours, removed out of the game card vending machine 3 for the stored currency to be taken out, and transported up to the cash control machine 2. The portable safe 4 is transported also during the business hours between the cash control machine 2 and the game card vending machine 3 when the amount of money stored in the portable safe 4 becomes too much and so part of the money has to be taken out. In any case, the manner of transporting the portable safe 4 is the same.

Figure 12:
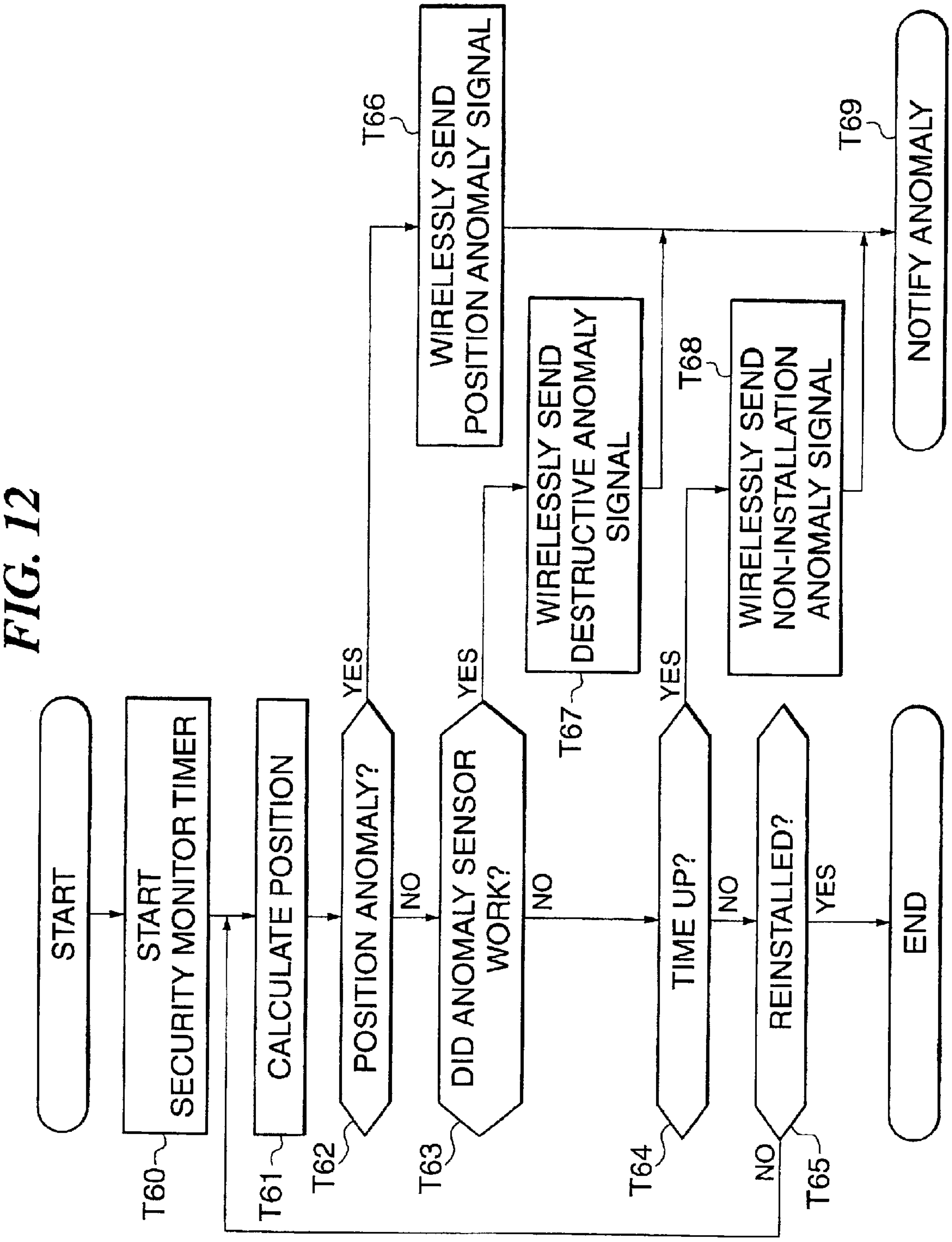
FIG. 12 is a flowchart of the embodiment showing the operation of the portable safe when the portable safe is in transit (from removal to installation into a device)

The control section 67, when the portable safe 4 is removed from the cash control machine 2 or the game card vending machine 3, starts the process shown in FIG. 12 to start first a built-in timer for security monitoring (T60).

After that, the control section 67 repeats the monitoring process loop consisting of steps T61 to T65 until the portable safe 4 is reinstalled in the cash control machine 2 or the game card vending machine 3.

In other words, the control section 67 monitors whether or not the portable safe 4 is in an appropriate position (or whether or not its movement locus is normal; T61, T62) by calculating its position on the basis of information coming from the security purpose wireless machine 6. The control section 67 also monitors whether or not any anomaly has been notified from the anomaly sensor 78 such as an impact sensor or a tilt sensor (T63), whether or not the time since the removal from a device has exceeded a specified duration (T64), and whether or not the portable safe 4 has been installed again in the game card vending machine 3 or the cash control machine 2 (T65). The above monitoring operation is repeated.

For example, when the portable safe 4 is near the entrance of the game facility's hall, or when the portable safe 4 is moving toward the entrance, the position is determined to be abnormal, and the control section 67 causes the wireless communication section 77 to send wirelessly signals including those of the ID of the portable safe 4, position anomaly, and the current position of the portable safe 4 (T66).

Also for example, when someone gives an impact to or tilts the portable safe 4 in an attempt of destroying it, an anomaly signal is sent from the anomaly sensor 78 to the control section 67, and the control section 67 causes the wireless communication section 77 to wirelessly send signals including those of the ID of the portable safe 4, destructive anomaly, and the current position of the portable safe 4 (T67).

Further for example, when the portable safe 4 is not installed back in the game card vending machine 3 or the cash control machine 2 after a specified period since it was removed from a device as someone hides the portable safe 4 in some place in the hall intending to take it out at a later time or tries to take currency out of the portable safe 4 (to the extent that the anomaly sensor 78 does not work), the control section 67 recognizes the anomaly on the basis of the duration counted with the security monitoring timer, and causes the wireless communication section 77 wirelessly to send signals of the ID of the portable safe 4, non-reinstallation anomaly, and the position at that time (T68).

In any case, the control section 67 causes, when signals related to anomaly are sent wirelessly, the buzzer 79 to sound to alert people present nearby or scare the perpetrator (T69). Incidentally, the sound of the buzzer preferably becomes increasingly loud, sounds at increasingly high pitches, or sounds intermittently at varying intervals especially gradually shortening intervals, so that it can easily arouse attention of the people.

Incidentally, the wirelessly sent information including the anomaly information is received with the security purpose wireless machine 6 and notified to the system control computer 7. At this time, the system control computer 7 gives out the notice with display, voice, etc. Thus, the personnel in the game facility take necessary actions. Moreover, the system control computer 7 may have, in addition to the function of giving out the notice described above, the function of giving notice to other computers or the like. For example, the notice may be given to computers of the head office of the game facility hall or to computers of a security company.

(A-2-4) Operation of Installing the Portable Safe 4 in the Game Card Vending machine 3.

Figure 13A:
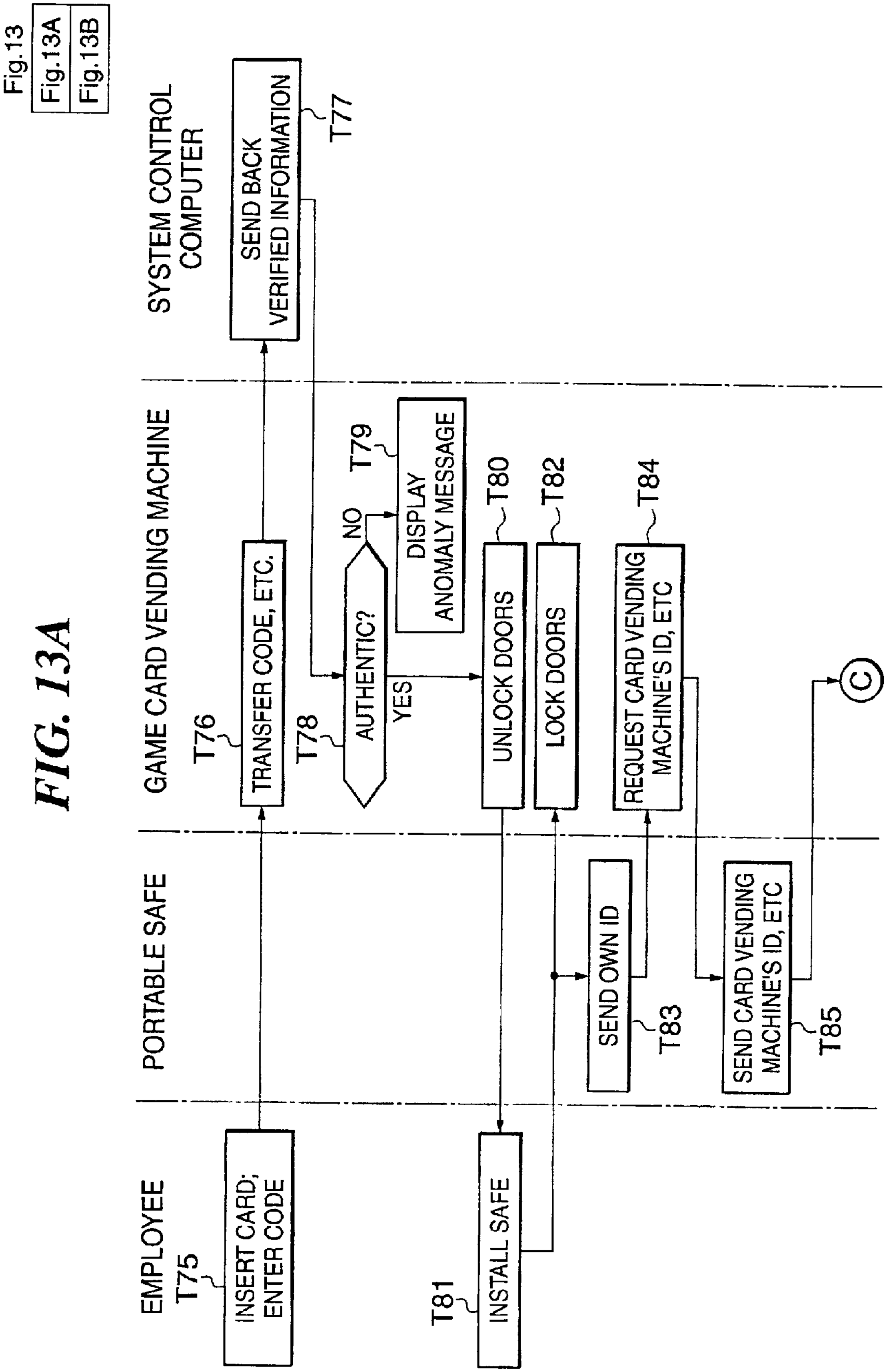
FIG. 13 is a sequence diagram (1) of the embodiment showing the operation of installing the portable safe into the game card vending machine.
Figure 13B:
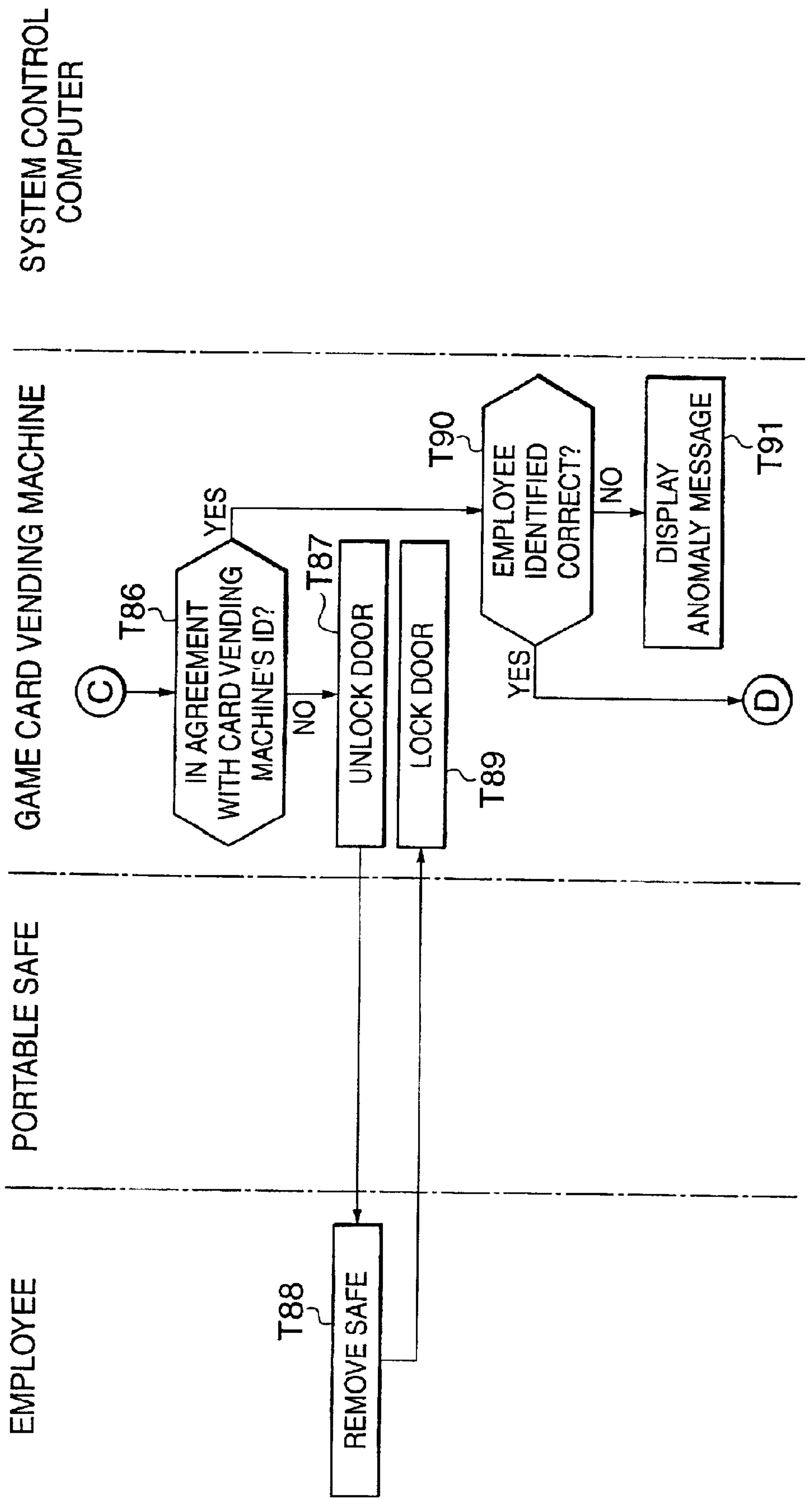
Figure 14:
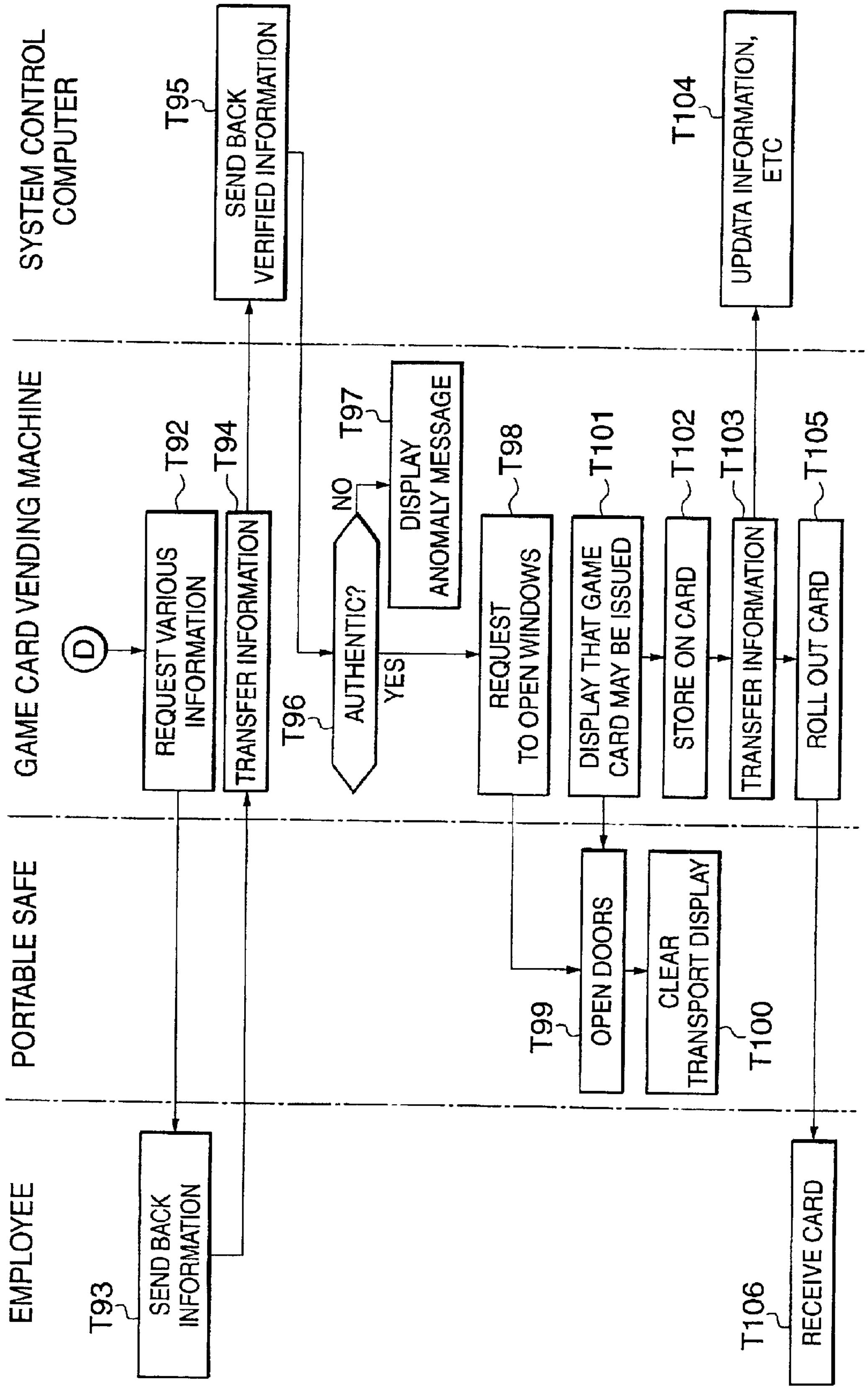
FIG. 14 is a sequence diagram (2) of the embodiment showing the operation of installing the portable safe into the game card vending machine.

Next, the operation of installing the portable safe 4 in the game card vending machine 3 will be described in reference to the sequence diagram shown in FIGS. 13 and 14.

The portable safe 4 into which currency is put before the business hours is installed to serve as a currency holding section in a specified game card vending machine 3. Also sometimes during the business hours, the portable safe 4 that currency is additionally put into or part of the currency is retrieved from with the cash control machine 2 may be installed again in the specified game card vending machine 3. In any case, the installing operation is the same.

The control section 33, in the state of standby without the installed portable safe 4, its display section 41 displays that the game card 30 cannot be issued and that the operator is requested to insert the operator's card 20. Then the employee (operator) inserts the operator's card 20 into the card slot 40 (T75). The information stored on the inserted operator's card 20 is read with the card access section 43 and given to the control section 33.

At this time, the control section 33 verifies the authenticity of the inserted operator's card 20 by the communication with the system control computer 7 through the communication processing section 44 (T76 to T78). The inserted operator's card 20 is determined to be authentic for example if the ID of the operator's card 20, the employee's code of the day made up of the employee's fixed code affixed with a generated random number, and the employee's business attendance time agree with those registered in the system control computer 7. Incidentally, if the operation of the game card vending machine 3 is permitted only to specified employees, the information stored on the operator's card 20, which is in agreement with the registered information but is that of an employee other than the specified employees, is not determined to be authentic.

In case the inserted operator's card 20 is not authentic, the control section 33 causes the display section 41 to display an anomaly message and causes the buzzer 46 to sound (T79).

On the other hand, if the inserted operator's card 20 is authentic, the control section 33 unlocks the door 39 and causes the display section 41 to display to that effect (T80). At this time, the employee opens the door 39, installs the portable safe 4 in the game card vending machine 3, and closes the door 39. As a result, a closure signal sent from the sensor (not shown) of the door 39 is given to the control section 33 which in turn causes the door 39 to lock (T81, T82).

The control section 67 of the portable safe 4 installed in the game card vending machine 3 recognizes the installation as power is supplied from outside, gives the ID of the portable safe 4 through the wireless communication section 75 to the game card vending machine 3. The control section 33 of the game card vending machine 3 that has taken the ID of the portable safe 4 through the wireless communication section 45 takes, through wireless communication, the ID of the game card vending machine 3 into which the portable safe 4 is to be installed and the operator's code of the operator who is handling the portable safe 4, and initially checks the agreement of the ID with its own ID (T83 to T86).

The control section 33, in case the ID is in disagreement, unlocks the door 39, causes the display section 41 to display a message of incorrect installation, and causes the buzzer 46 to sound (T87). At this time, the employee opens the door 39, takes out the portable safe 4, and closes the door 39. As a result, a closure signal sent from the sensor (not shown) of the door 39 is given to the control section 33 which in turn locks the door 39 and causes the display section 41 to display a message of a standby state, meaning that the portable safe 4 is not installed (T88, T89).

In case the ID is in agreement, the control section 33 checks if the employee who has inserted the operator's card 20 is in agreement with the employee of the employee's fixed code stored in the portable safe 4 (T90).

The control section 33, in case the employee in question is not correct, causes the display section 41 to show a message of incorrect employee and causes the buzzer 46 to sound (T91).

If the employee is correct, the control section 33 takes information by wireless communication, from the portable safe 4 side, on the time of removal from the cash control machine 2 and on the numbers by the denomination of currency, transfers information on the ID, the time of removing the portable safe 4 from the cash control machine 2, and the numbers by the denomination of currency to the system control computer 7 through the communication processing section 22 for checking if the installed portable safe 4 is correct (T92 to T96). For example, the portable safe 4 is determined to be incorrect when the numbers by the denomination of currency in the memory of the portable safe 4 are not in agreement with those in the system control computer 7, or when the ID of the portable safe 4 is not registered in the system control computer 7, or when the time of removal in the memory of the portable safe 4 is not in agreement with that in the system control computer 7.

In case the installed portable safe 4 is not correct, the control section 33 causes the display section 41 to display an anomaly message and causes the buzzer 46 to sound (T97).

In contrast, in case the installed portable safe 4 is correct, the control section 33 gives instruction through the wireless communication section 45 to the portable safe 4 to open the windows 50 to 53 (to move the shutter plates 54 to 57) which will be the currency port and to turn off the display during transport. The control section 67 of the portable safe 4 which has received the instruction through the wireless communication section 75 causes the windows 50 to 53 to open and causes the display section 73 to turn off the display during transport (T98 to T100).

The control section 33 of the game card vending machine 3 causes the display section 41 to display the state of standby, in which a game card 30 may be issued (T101). Moreover, the control section 33, through the card access section 43, causes the operator's card 20 to store the operation history of this time, and also causes the built-in memory section to store the operation history of this time, and also sends to the system control computer 7 the operation history and the information that the game card vending machine 3 has become capable of issuing game cards 30 and have them stored (T102 to T104).

And the control section 33 causes the operator's card 20 to be rolled out through the card slot 40, and the employee receives the operator's card 20 (T105, T106).

Incidentally, the operation of issuing the operator's card 20 from the game card vending machine 3 into which the portable safe 4 is installed is the same as that with conventional devices, except that the portable safe 4 is used as a currency storage. Therefore, the explanation of that operation is omitted. Incidentally, the change in the numbers by the denomination of currency due to issuing the game cards 30 is updated in the game card vending machine 3 as information on the numbers of currency in the portable safe 4 and also notified from the game card vending machine 3 to the system control computer 7 and updated appropriately.

(A-2-5) Operation of Removing the Portable Safe 4 From the Game Card Vending Machine 3.

Figure 15:
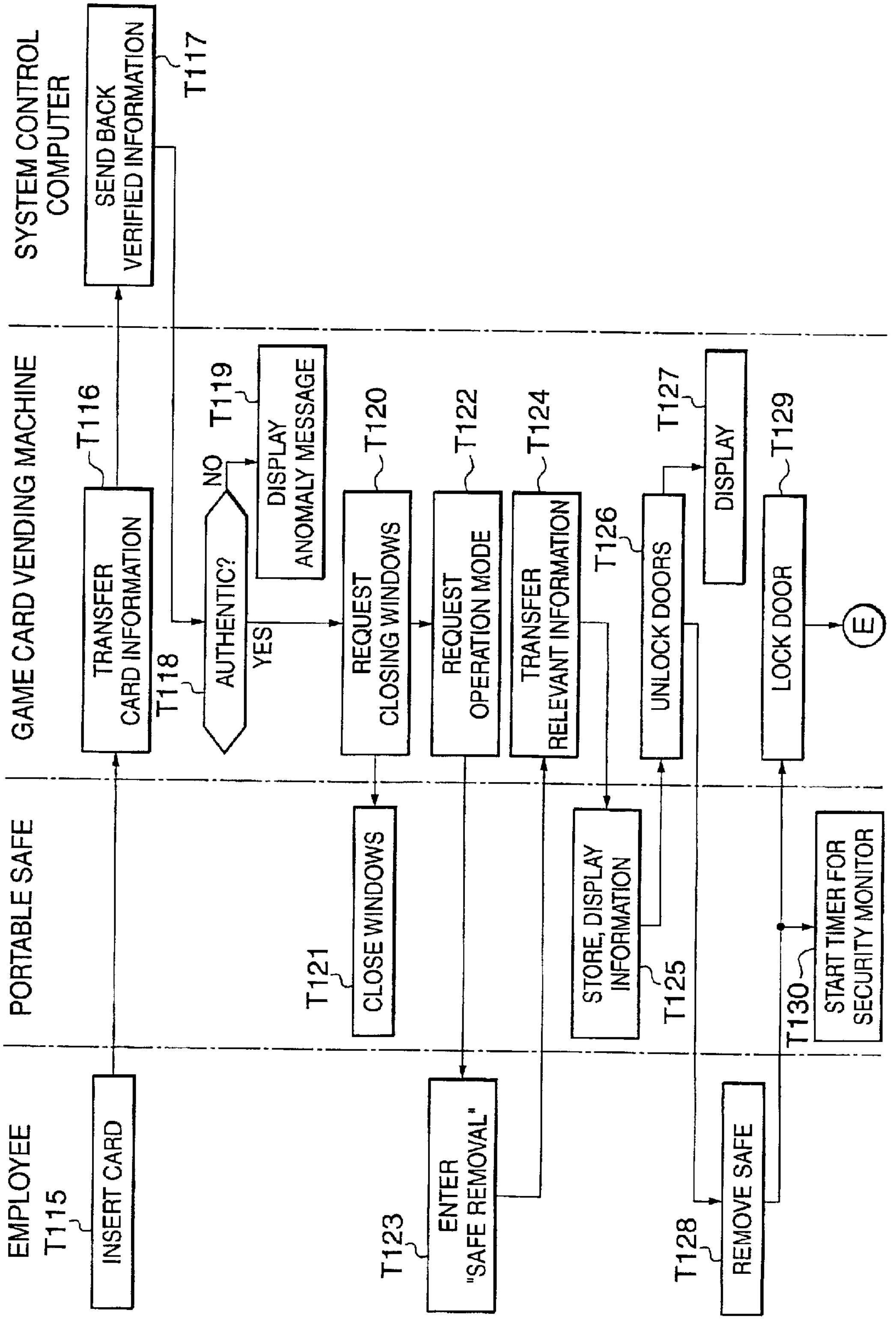
FIG. 15 is a sequence diagram (1) of the embodiment showing the operation of removing the portable safe from the game card vending machine.
Figure 16:
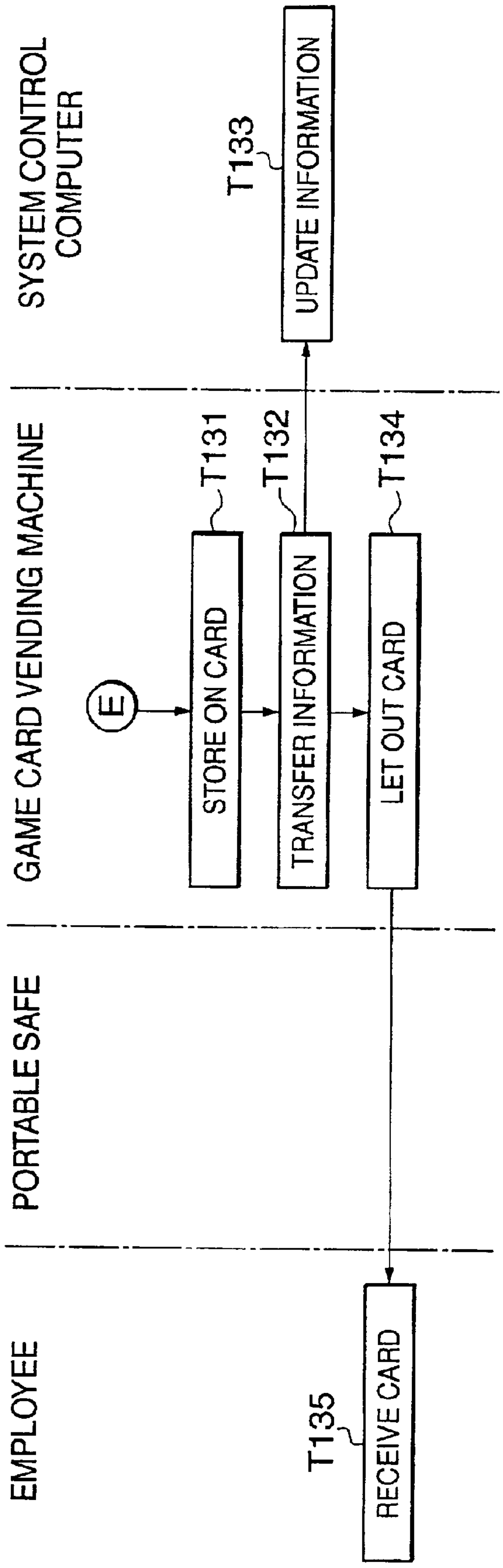
FIG. 16 is a sequence diagram (2) of the embodiment showing the operation of removing the portable safe from the game card vending machine.

Next, the operation of removing the portable safe 4 from the game card vending machine 3 will be described in reference to the sequence diagram shown in FIGS. 15 and 16.

After the business hours, the portable safe 4 is retrieved from the specified game card vending machine 3. Also sometimes during the business hours, the portable safe 4 is removed from the specified game card vending machine 3 to replenish currency with the cash control machine 2 or to retrieve part of the currency with the cash control machine 2. In any case, the removal operation is the same.

In the standby state in which the portable safe 4 is installed, the employee is supposed to start the operation of the game card vending machine 3 by inserting the operator's card 20.

When the employee inserts the operator's card 20 into the card slot 40 in the standby state in which the portable safe 4 is installed, the control section 33 recognizes the fact, takes in the information read and stored with the card access section 43, communicates with the system control computer 7 through the communication processing section 44 to check the authenticity of the inserted operator's card 20 (T115 to T118). If it is determined not to be authentic, the process is the same as that of the above-described case of installing the portable safe 4.

In case the inserted operator's card 20 is not authentic, the control section 33 causes the display section 41 to display an anomaly notifying message and causes the buzzer 46 to sound (T119).

On the other hand, in case the inserted operator's card 20 is authentic, the control section 33 through wireless communication instructs the control section 67 of the portable safe 4 to close the windows 50 to 53 which have been opened. And the control section 67 of the portable safe 4 causes the windows 50 to 53 which have been opened to close (to return the shutter plates 54 to 57 to original positions) and lock (T120, T121).

After that, the control section 33 of the game card vending machine 3 causes the display section 41 to display a message that an operation mode must be specified (T122). Since no input section is provided in the game card vending machine 3 of this embodiment, specifying the operation mode when an authentic operator's card 20 is inserted while the portable safe 4 is installed is performed by the use of any of denomination specifying buttons 42 for specifying the amount of memory of the game card 30 (with each button allocated to an operation mode).

That is to say, the employee operates an appropriate button to specify the mode of taking out the portable safe 4 (T123).

After that, the control section 33 of the game card vending machine 3 gives appropriate information through wireless communication to the control section 67 of the portable safe 4. The control section 67 of the portable safe 4 stores the information in its built-in memory section and causes the display section 73 to show the information (T124, T125). For example, the pieces of information stored here include the numbers by the denomination of currency stored, the ID of the game card vending machine 3 in which the portable safe 4 is installed, the code of the operator (employee) who transports the portable safe 4, and the time of removal at which the portable safe 4 is removed. Also for example, the ID of the game card vending machine 3, the code of the operator (employee) who transports the portable safe 4, and the numbers by the denomination of currency are displayed.

And the control section 33 of the game card vending machine 3 unlocks the door 39 and causes the display section 41 to display to that effect (T126, T127).

As the employee opens the door 39, removes the portable safe 4 from the game card vending machine 3, and closes the door 39, consequently a closure signal from the sensor (not shown) of the door 39 is sent to the control section 33, and the control section 33 locks the door 39 (T128, T129).

The control section 67 of the portable safe 4 recognizes the removal as the power supply from outside is stopped, and stores in its inside the removal time data, and starts security operation including starting the monitor timer (T130). The process thereafter with the portable safe 4 has been described above about the transport operation.

As the door 39 is locked, the control section 33 of the game card vending machine 3 causes the card access section 43 to store the operation history of this time on the operator's card 20 and also in its built-in memory section, and it also causes the system control computer 7 to transfer, store, update, and set various pieces of information on the operation history and the removed portable safe 4 (T131 to T133).

And the control section 33 causes the operator's card 20 to be let out through the card slot 40, returns to a standby state in which the portable safe 4 is not installed, and the employee receives the operator's card 20 (T134, T135).

(A2-6) Operation of Retrieving Currency From the Portable Safe 4.

Figure 17:
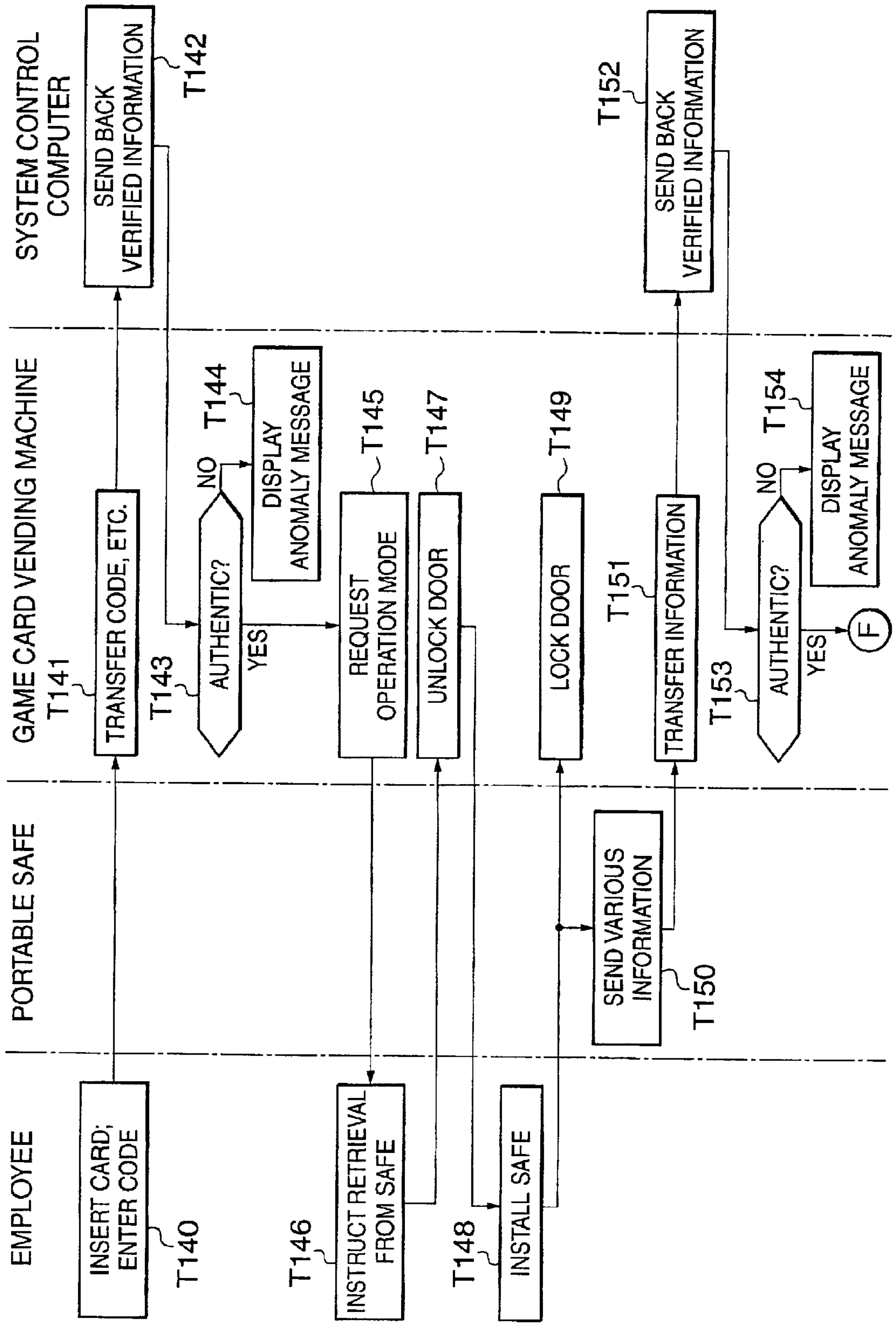
FIG. 17 is a sequence diagram (1) of the embodiment showing the operation of retrieving money from the portable safe.
Figure 18:
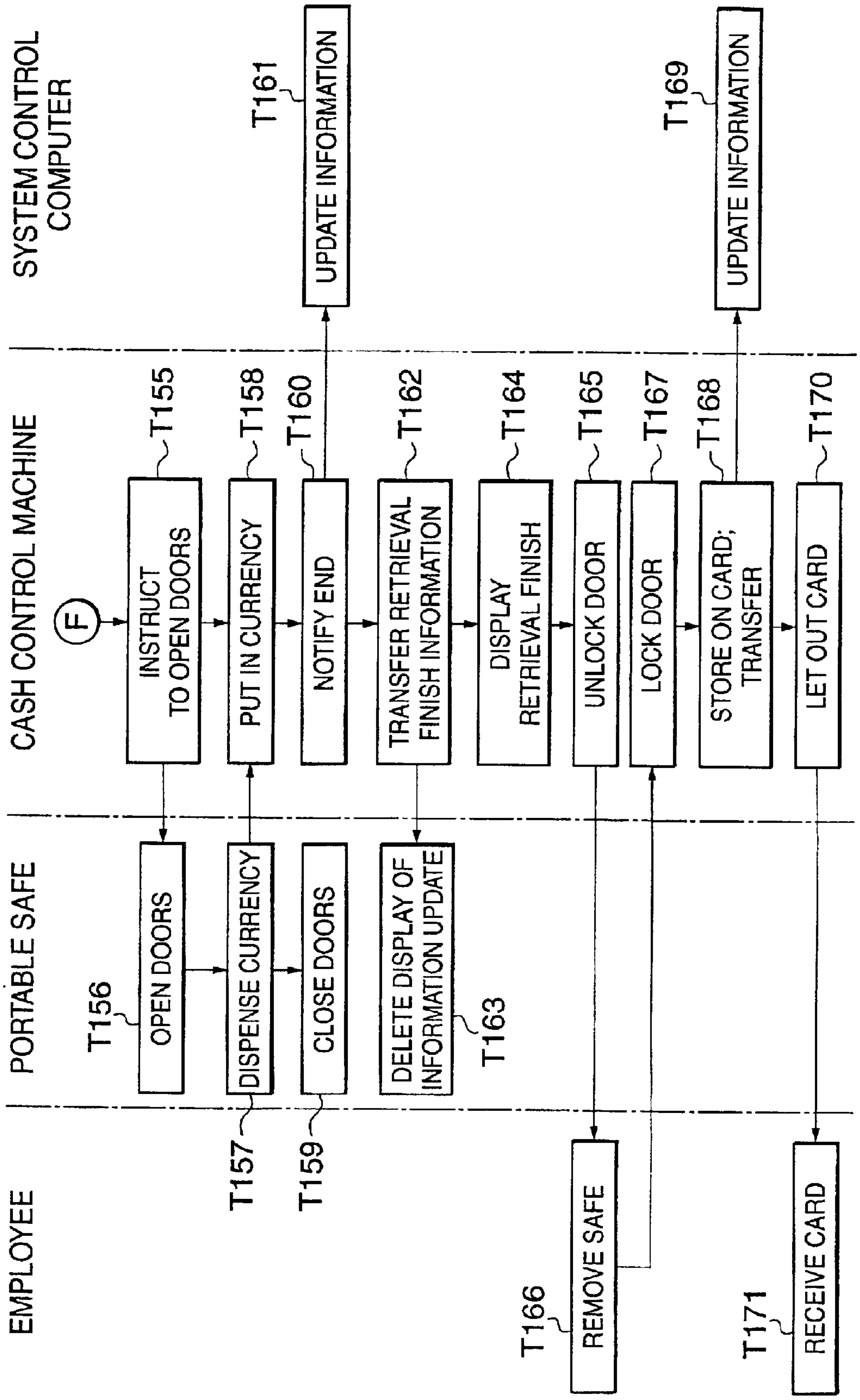
FIG. 18 is a sequence diagram (2) of the embodiment showing the operation of retrieving money from the portable safe.

Next, the operation of retrieving currency from the portable safe 4 using the cash control machine 2 is described in reference to the sequence diagram shown in FIGS. 17 and 18.

After the business hours, the currency in the portable safe 4 is retrieved with the cash control machine 2. Part of the currency in the portable safe 4 is also retrieved occasionally with the cash control machine 2 when the amount of money stored in the portable safe 4 becomes too much. Since the retrieval operation is almost the same for both of the above cases, the following description is made about the former case.

The control section 12 of the cash control machine 2 in its standby state displays on the display section 19 a message requesting insertion of the operator's card 20 and entry of the operator's code (employee's fixed code here). So the employee (operator) inserts the operator's card 20 into the card slot 17 and enters his or her own, employee's fixed code using the input section 18 (T140). The information on the inserted operator's card 20 is read with the card access section 21.

Here, the control section 12 communicates through the communication processing section 22 with the system control computer 7 to check if the entered employee's fixed code is authentic and also if the operator's card 20 inserted is authentic (T141 to T143).

In case the entered employee's fixed code or the inserted operator's card 20 is not authentic, the control section 12 causes the display section 19 to display an anomaly message and causes the buzzer 24 to sound (T144).

On the other hand, in case the entered employee's fixed code and the inserted operator's card 20 are authentic, the control section 12 causes the display section 19 to display a message requesting to specify an operation mode (T145).

The process up to here is the same as that, described above, of putting money into the portable safe 4 before the business hours.

In response to the operation mode entry request, the employee specifies through the input section 18 a mode of retrieving all the currency from the portable safe 4. At this time, the control section 12 unlocks only the outer door 15 (T146, T147).

The employee opens the door 15, installs the portable safe 4 in the cash control machine 2, and closes the door 15. As a result, a closure signal from the sensor (not shown) of the door 15 is given to the control section 12 which in turn causes the door 15 to lock (T148, T149).

The control section 67 of the portable safe 4 installed in the cash control machine 2 recognizes the installation as power is supplied from outside, and gives various pieces of information stored in the portable safe 4 through the wireless communicating section 75 to the cash control machine 2. The control section 12 of the cash control machine 2, upon receiving the information stored in the portable safe 4 through the wireless communicating section 23, communicates with the system control computer 7 through the communication processing section 22 to verify the authenticity of the installed portable safe 4 (T150 to T153). The authenticity is denied when for example the ID of the installed portable safe 4 is not registered in the system control computer 7, or when the ID of the installed portable safe 4 coincides with the ID of a portable safe 4 from which all the currency is already retrieved, or when the employee who removed the portable safe 4 from the game card vending machine 3 is not the same person related to the inserted operator's card 20, or when the numbers by the denomination of currency memorized in the portable safe 4 are not in agreement with those memorized in the system control computer 7.

Incidentally, while checking by comparison is done by obtaining information piece by piece (refer to previous description on operation), since it is already clear from the previous description, here it is collectively described.

In case the installed portable safe 4 is not correct, the control section 12 causes the display section 19 to display an anomaly message and causes the buzzer 24 to sound (T154).

In contrast, in case the installed portable safe 4 is authentic, the control section 12 instructs the portable safe 4 through the wireless communication section 23 to open the windows 52 and 53 (to move shutter plates 56 and 57) which serve as currency discharge ports. The control section 67 of the portable safe 4, having received the instruction through the wireless communication section 75, causes the windows 52 and 53 to open up (T155, T156).

After that, under the control of the control sections 12 and 67, currency is moved from the currency holding section 72 of the portable safe 4 through the currency counting section 11 to the fixed safe 10 of the cash control machine 2 (T157, T158).

When all the currency held in the portable safe 4 is retrieved (moved) as described above, the control section 67 of the portable safe 4 causes the windows 52 and 53, which have been open, to close (to move the shutter plates 56 and 57 to the original positions) and lock (T159).

On the other hand, the control section 12 of the cash control machine 2, notifies when all the currency held in the portable safe 4 is retrieved, the fact through the communication process section 22 to the system control computer 7. The system control computer 7 updates various pieces of information including the state of the portable safe 4 (T160, T161). For example, it sets the state information of the portable safe 4 to be one in which currency is not yet put in, resets the numbers by the denomination of currency to zero, clears the information on the portable safe 4 corresponding to the game card vending machine 3 in which the portable safe 4 is installed, clears the information on the portable safe 4 corresponding to the employee, or updates with an increase in the numbers of currency in the cash control machine 2 according to the retrieved quantities.

Also, the control section 12 of the cash control machine 2 through wireless communication gives relevant information, that the retrieval is finished, to the control section 67 of the portable safe 4. The control section 67 of the portable safe 4 stores in its built-in memory section the information on the completion of retrieval and causes the display section 67 to display the message of completion of retrieval (T162, T163).

The control section 12 of the cash control machine 2 further causes the display section 19 to display the message of completion of currency retrieval from the portable safe 4, and also unlocks only the outer door 15 (T164, T165).

As the employee opens the door 15, removes the portable safe 4 from the cash control machine 2, and closes the door 15, a closure signal from a sensor (not shown) of the door 15 is given to the control section 12 which in turn causes the door 15 to lock (T166, T167).

While the control section 67 of the portable safe 4 recognizes the removal as the power supply from outside is stopped, performs no process because no currency is held in the portable safe 4. Incidentally, it may also be arranged like the case in which currency is held in the portable safe 4 to perform security process as by memorizing the removal time inside and starting the security monitoring timer.

As the door 15 is locked, the control section 12 of the cash control machine 2 causes the card access section 21 to store the operation history of this time on the operator's card 20 and also in the built-in memory section, and also to send and store the operation history to the system control computer 7 (T168, T169).

And the control section 12 causes the operator's card 20 to be let out from the card port 17, returns to the standby state to wait for various actions. The employee receives the operator's card 20 (T170, T171).

(A-2-7) Operation When the Employee Leaves the Work Place.

Figure 19:
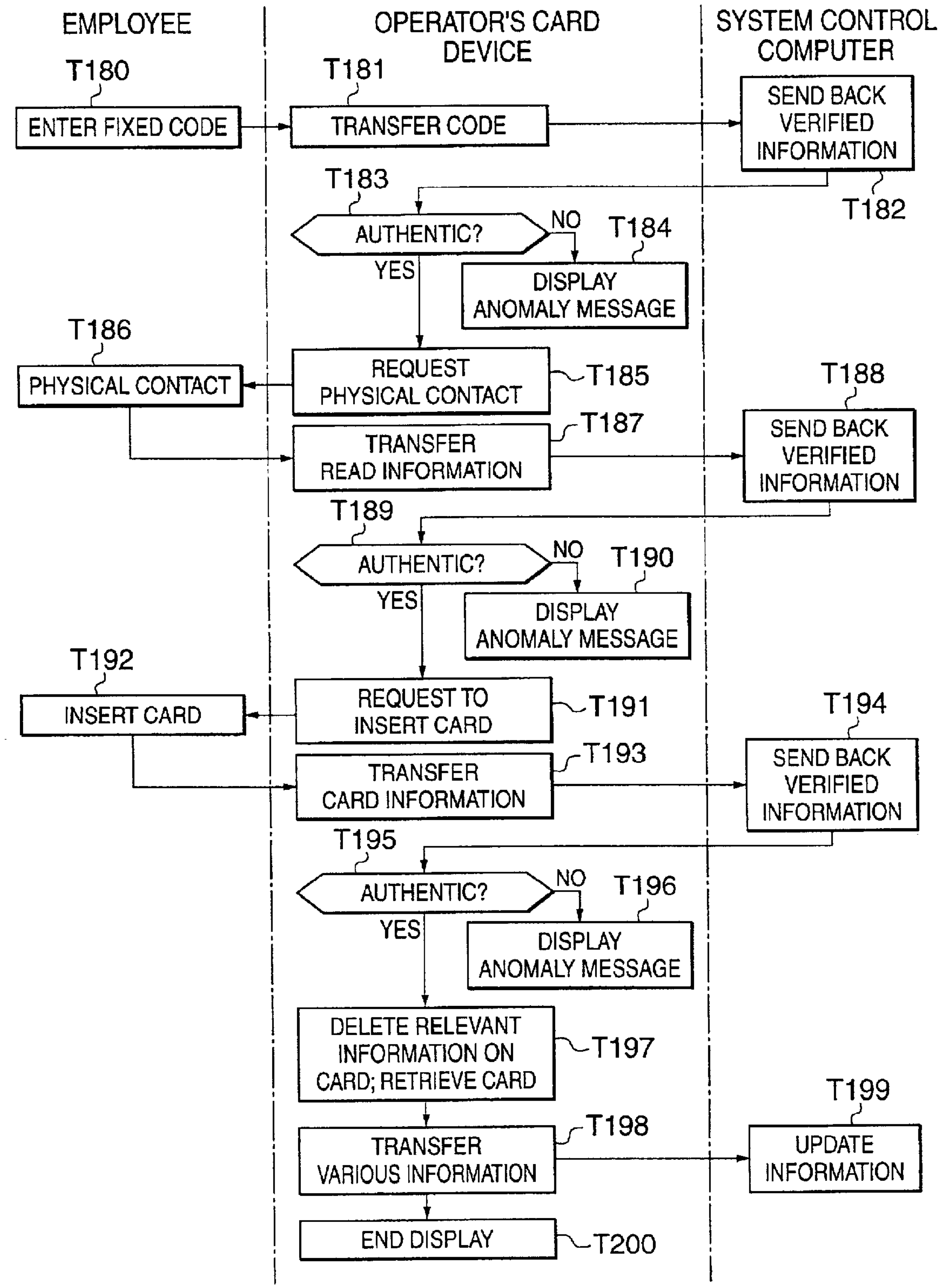
FIG. 19 is a sequence diagram of the embodiment showing the operation when the employee leaves the work place.

Next, the operation when the employee leaves the work place will be described in reference to the sequence diagram shown in FIG. 19.

The control section 81 of the operator's card device 5 in its standby state causes the display section 88 to display a message requesting entry of the employee's fixed code. The employee who is about to leave the work place uses the input section 86 to enter his or her own employee's fixed code (T180).

Here, the control section 81 communicates through the communication process section 89 with the system control computer 7 to check the employee's fixed code for its authenticity (T181 to T183).

In case the entered employee's fixed code is not authentic, the control section 81 causes the display section 88 to display an anomaly message and returns to the standby state (T184).

On the other hand, in case the entered employee's fixed code is authentic, the control section 81 causes the display section 88 to display a message requesting the employee to bring a relevant part of his or her body into contact with or in the vicinity of the individual's information reading section (fingerprints reading device) 85 (T185). In this way, the employee has the image of his or her relevant body part read with the individual's information reading section 85. The control section 81 communicates with the system control computer 7 through the communication processing section 89 to verify whether the read image information corresponds to the employee's fixed code (T186 to T189).

The control section 81, in case the read image data is not right, causes the display section 88 to display an anomaly message and brings the display back to that of the standby state (T190).

On the other hand, in case the image data is right, the control section 81 causes the display section 88 to display a message requesting inserting the operator's card 20 into the card slot 82. The employee, in response to it, inserts the operator's card 20 into the card slot 82 (T191, T192). The information stored on the operator's card 20 is read with the card access section 83 and given to the control section 81.

Here, the control section 81 communicates through the communication process section 89 with the system control computer 7 to check the inserted operator's card 20 for its authenticity (T193 to T195). It is determined not to be authentic for example when the employee's fixed code affixed with a random number (the employee's code of that day) or the operation history is not in agreement with that in the system control computer 7.

In case the inserted operator's card 20 is not authentic, the control section 81 causes the display section 88 to display an anomaly message and causes a buzzer (not shown) to sound (T196).

On the other hand, in case the inserted operator's card 20 is authentic, the control section 81 causes the card access section 83 to delete information other than the ID of the inserted operator's card 20 and then causes the operator's card holding section 80 to retrieve the operator's card 20 (T197).

Also, the control section 81 picks up the time data at that point (work place leaving time) from the built-in timer, transfers the ID of the retrieved operator's card 20, the employee's code of the day made up of the employee's fixed code and a generated random number, and the work place leaving time to the system control computer 7 and causes the system control computer 7 to update various pieces of information (T198, T199). After that, the display is changed to show the state of the process being over (T200) and finally returned to the standby state display. The functions of the system control computer 7 include for example calculating the day's work hours of the employee.

(A-2-8) Other operations.

Operations other than those described above in detail will be briefly described below without reference to drawings. In particular, the operation of the cash control machine 2 will be described.

(A) First, operation of replenishing money to or retrieving money from the fixed safe 10 of the cash control machine 2 (replenishing money to or retrieving money from the fixed safe 10 without using the currency port 13) will be described.

Bank clerks, security company personnel, and management personnel of the game facility are provided with a different type of operator's cards 20 from the type for employees, so that those people are verified to be persons to handle currency in the fixed safe 10 when such operator's cards 20 are inserted into the cash control machine 2. Here, it may also be arranged so that a secret code is given to the system computer 7 before handling the cash control machine 2, and the operator is permitted to operate the cash control machine 2 on additional condition that the operator enters the secret code.

When the operator is verified, the cash control machine 2 unlocks the double doors 15 and 16. The operator opens up the doors 15 and 16 to directly put money into or take out money from the fixed safe 10, and closes and locks the doors 15 and 16. Incidentally, the inner door 16 serving as a door for the fixed safe 10 may be arranged to be opened on condition of inserting a physical key as well as an electromagnetic key (the same condition may be added also to the outer door 15).

When the amount of money in the fixed safe 10 changes as a result of operation described above, the amount is counted again with the currency counting section 11 to update the currency amount controlled in the system control computer 7.

(B) The cash control machine 2 has also the function of the so-called ATM used in banks or the like.

For example, when cash is needed in managing the game facility for payment to suppliers of prize goods that are given to game players in exchange for pachinko balls won, cash is taken out of the cash control machine 2.

In that case, the operator is verified as the operator inserts the operator's card 20 or enters the employee's fixed code into the cash control machine 2. As the operator specifies a cash dispensing mode and the amount of cash to be dispensed, cash (currency) is discharged through the currency port 13. As a matter of course, the numbers by the denomination of currency in the cash control machine 2 are updated in the system control computer 7.

In contrast, when the game facility management receives cash when for example it purchases prize goods and receives change, the cash is put into the cash control machine 2.

In that case too, the operator is verified as the operator inserts the operator's card 20 or enters the employee's fixed code into the cash control machine 2, and the operator specifies a cash entry mode, and puts in cash (currency) through the currency port 13. The money put in is counted with the currency counting section 11 and the numbers by the denomination of currency in the cash control machine 2 are updated in the system control computer 7.

(C) As described above, since the cash control machine 2 serves also as the ATM, it may also be used for payment of salaries and part-time workers' wages.

With the functions of the operator's card device (employee's card device) 5 and the system control computer 7 as described above, data of work hours per each day for each employee can be confirmed. Based on that data, the system computer 7 calculates salary of every employee and wage of every part time worker for the month. Incidentally, it may also be arranged so that a host computer of a higher rank (not shown; such as one placed in the head office) than the system control computer 7 performs such calculation.

On the payday, the employee inserts the operator's card 20 and enters the employee's fixed code into the cash control machine 2, so as to be identified, and specifies a salary payment mode. Then, the payment amount information is transferred from the system control computer 7 to the cash control machine 2, and the salary (currency) is paid out through the currency port 13. The numbers by the denomination of currency in the cash control machine 2 are updated in the system control computer 7 and the information related to the employee is memorized as paid. Incidentally, the cash control machine 2 may be provided with a function as a printer, so that a statement of payment may be printed out.

(A-3) Effects of the Embodiment

According to the currency control system (individual identification card system) of the above embodiment, the employee's code (individual identification code) stored on the operator's card (individual identification card) 20 is made up of the employee's fixed code and a random number generated on that day, which varies from day to day and so is difficult to counterfeit.

Even if the operator's card 20 is stolen, the cash control machine 2 or the game card issuing machine 3 cannot be operated with the stolen operator's card 20 unless it is used within that day, which means an enhanced security function against theft in comparison with conventional counterparts.

Furthermore, since the operator's card 20 is retrieved when the operator leaves the work place, it is also in this respect difficult to counterfeit.

Furthermore, since the operator's cards 20 are discharged from the device in the order of the topmost card first when employees come to the work place, it is highly probable that the operator's cards 20 that the employees carry are different for each day. Also, the card IDs of the operator's cards 20 are used to check the employees. Therefore, check security is enhanced and forgery is difficult.

(B) Other Embodiments.

While various other embodiments are mentioned in the description of the above embodiment, there can be further modified embodiments as enumerated below.

In the above embodiment, the cash control machine 2 and the game card issuing machine 3 are shown as example devices that check the operators (employees) using the operator's card 20. However, examples are not restricted to the above mentioned devices as a matter of course.

In the above embodiment, it is assumed that the operator's card device (employee's card device) 5 collects the operator's cards 20 after the business hours. However, the device may be one that does not collect the operator's cards 20. In that case too, it is preferable that the employee's fixed code affixed with a random number (employee's code of that day) is recorded on the operator's cards 20 when the operator comes to the work place and the random number portion is erased when the operator leaves the work place.

Further as a matter of course, the operator's card (employee's card) may be used not only with the cash control machine 2 and the game card issuing machine 3 but also for other purposes such as settling accounts in company cafeteria or the like.

Furthermore, the operator's card device (employee's card device) 4 may be one that does not have the time clock function.

It may also be arranged that the recording a new random number onto the operator's card 20 is made for the next day not in the issue but in the collection of the operators card 20.

It may also be arranged that security code numbers (password, PIN) allocated to employees are recorded on the operators cards 20 to be collated with the security code numbers entered by the employees. In that case, it is necessary that the security code numbers for respective employees are pre-recorded in the system control computer 7, and when the employees come to the work place, the security code numbers are recorded together with random numbers.

Furthermore, the updating cycle of the random number recorded on the operator's card 20 is not limited to one day. For example, it may be arranged that the random number is rewritten immediately before the operator's card 20 is discharged from the cash control machine 2 or game card issuing machine 3. In that case, the cash control machine 2 or game card issuing machine 3 may be provided with a random number generating section, or the system control computer 7 may be provided with a random number generating section to give random numbers to the cash control machine 2 and game card issuing machine 3.

The system which utilizes the individual identification card system of the invention is not limited to the currency control system in game facilities.

As described above, an individual identification card system of the embodiment of the present invention comprises: random number generating means for generating random numbers; an individual identification card at least having recorded on it an individual identification code made by affixing a random number generated with the random number generating means to an individual fixed code peculiar to the individual; individual identification card recording means for recording on the individual identification card an individual identification code including an updated or additional random number when a specified event occurs; collation-purpose information control means which controls for collating the same code as the individual identification code recorded on the individual identification card; and collating means which reads the individual identification code recorded on the individual identification card to collate with the code controlled with the collation-purpose information control means. Therefore, an individual identification card system is realized that has high security.

As described hereinbefore, to solve the problems, an individual identification card system of the embodiment of the present invention comprises: random number generating means (87) for generating random numbers; an individual identification card (20) at least having recorded on it an individual identification code made by affixing a random number generated with the random number generating means to an individual fixed code peculiar to the individual; individual identification card recording means (80) for recording on the individual identification card an individual identification code including an updated or additional random number when a specified event occurs; collation-purpose information control means (7) which controls for collating the same code as the individual identification code recorded on the individual identification card; and collating means (2, 3) which reads the individual identification code recorded on the individual identification card to collate with the code controlled with the collation-purpose information control means.

Here, it is preferable to further provide an individual identification card device (5) of a box shape, having a card holding section (80) capable of holding plural number of the individual identification cards, capable of discharging the individual identification cards held in the card holding section to the outside of the device and collecting into the card holding section the individual identification cards inserted from outside into the device, wherein the individual identification card device is provided with the individual identification card recording means.

Furthermore, it is preferable that the individual identification card device is provided with an entry section (86) that permits entry of the individual fixed code and a request for discharging the individual identification card, so that, when the individual fixed code is entered and a request for discharging the individual identification card is entered through the entry section, the individual identification code is recorded on one individual identification card with the individual identification card recording means, and the individual identification card is discharged outside the device.

Also it is preferable that the individual identification card has card identification information, the individual identification card device gives the information made by combining together the card identification information of the discharged individual identification card and the individual identification code recorded on the discharged individual identification card to the collation-purpose information control means so that the given information is controlled with the collation-purpose information control means, and that the collation-purpose information control means also performs collation process of the card identification information of the individual identification card which is the subject of collation.

It is also preferable that the individual identification card system has an individual's specified part image obtaining section (85) for obtaining an image of specified part of an individual, and individual recognition means (7) in any position in the system for identifying an individual on the basis of the obtained individual's part image, and that one of conditions of the individual identification card device to discharge the individual identification card is that the recognition process with the individual recognition means results in that an individual is permissible to carry the individual identification card.

It is also preferable that the individual identification card device has a code erasing section (80) for erasing the individual identification code from the inserted individual identification card before collecting the inserted individual identification card into the card holding section.

It is also preferable that the individual identification card device has a time clock function means for controlling and summing up time information on time points at which the individual identification card is discharged and collected.

It is also preferable that the collation means is provided in relation to operator-specific devices (2, 3) that restrict individuals permitted to operate by opening the door or lid.

What is claimed is:

1. An individual identification card system comprising:

random number generating means for generating random numbers;

individual identification card recording means, located at a first location, for recording an individual identification code on an individual identification card, the individual identification code being created by affixing a random number generated by said random number generating means to a fixed individual code, peculiar to a respective individual, a new individual identification code with a renewed random number or a newly added individual identification code being recorded on the individual identification card when a specified event occurs;

a first card access section for reading information recorded on the individual identification card by said individual identification card recording means and located at a second location, separate from the first location;

collation-purpose information control means that controls, for collating, the same individual identification code as recorded on the individual identification card by said individual identification card recording means, said collation-purpose information control means being located at a third location, separate from the second location;

collating means that reads the individual identification code recorded on the individual identification card for collation with the code controlled by said collation-purpose information control means; and an individual identification card device including a card holding section holding a plurality of the individual identification cards, dispensing the individual identification cards held in said card holding section, and retrieving the individual identification cards in said individual identification card holding section, said individual identification cards to be retrieved being inserted from outside, said individual identification card device including said individual identification card recording means.

2. The individual identification card system according to claim 1, wherein said individual identification card device includes an entry section that permits entry of the fixed individual code and entry of requests for dispensing individual identification cards so that, when the fixed individual code is entered through said entry section and a request for dispensing an individual identification card is entered, the individual identification code is recorded on one of the individual identification cards by said individual identification card recording means and the individual identification card is dispensed from said individual identification card device.

3. The individual identification card system according to claim 2, wherein each individual identification card includes card identification information, and said individual identification card device gives information allowing the card identification information of the individual identification card dispensed to correspond to the individual identification code recorded on the individual identification card dispensed, to said collation-purpose information control means so that the information is controlled by said collation-purpose information control means, and so that said collating means collates the card identification information of the individual identification card.

4. The individual identification card system according to claim 2, wherein said individual identification card device includes an individual's specified body part image obtaining section for obtaining an image of an individual's specified body part and individual recognition means for identifying an individual, based on the image of the specified body part obtained, said individual recognition means being located in said individual identification card system, and one condition for said individual identification card device to dispense individual identification card is identification by said individual recognition means that the individual is permitted to carry the individual identification card.

5. The individual identification card system according to claim 2, wherein said individual identification card device includes a code erasing part for erasing the individual identification code from an inserted individual identification card, before the individual identification card inserted is retrieved in said card holding section.

6. The individual identification card system according to claim 2, wherein said individual identification card device includes a time clock function means for controlling time information on an individual identification card.

7. The individual identification card system according to claim 2, comprising an operator restricting device having a door or lid that restricts individuals permitted to open and operate said door or lid, wherein said collating means is provided in relation to said operator restricting device.

8. The individual identification card system according to claim 1, comprising a second card access section located at a fourth location, different from the second location, said collation-purpose control means being located remotely from the second and fourth locations.

9. The individual identification card system according to claim 1, wherein each individual identification card includes card identification information, and said individual identification card device gives information allowing the card identification information of the individual identification card dispensed to correspond to the individual identification code recorded on the individual identification card dispensed, to said collation-purpose information control means so that the information is controlled by said collation-purpose information control means, and so that said collating means collates the card identification information of the individual identification card.

10. The individual identification card system according to claim 9, wherein said individual identification card device includes an individual's specified body part image obtaining section for obtaining an image of an individual's specified body part and individual recognition means for identifying an individual, based on the image of the specified body part obtained, said individual recognition means being located in said individual identification card system, and one condition for said individual identification card device to dispense an individual identification card is identification by said individual recognition means that the individual is permitted to carry the individual identification card.

11. The individual identification card system according to claim 9, wherein said individual identification card device includes a code erasing part for erasing the individual identification code from an inserted individual identification card, before the individual identification card inserted is retrieved in said card holding section.

12. The individual identification card system according to claim 4, wherein said individual identification card device includes a time clock function means for controlling time information on an individual identification card.

13. The individual identification card system according to claim 9, comprising an operator restricting device having a door or lid that restricts individuals permitted to open and operate said door or lid, wherein said collating means is provided in relation to said operator restricting device.

14. The individual identification card system according to claim 2, wherein said individual identification card device includes an individual's specified body part image obtaining section for obtaining an image of an individual's specified body part and individual recognition means for identifying an individual, based on the image of the specified body part obtained, said individual recognition means being located in said individual identification card system, and one condition for said individual identification card device to dispense an individual identification card is identification by said individual recognition means that the individual is permitted to carry the individual identification card.

15. The individual identification card system according to claim 14, wherein said individual identification card device includes a code erasing part for erasing the individual identification code from an inserted individual identification card, before the individual identification card inserted is retrieved in said card holding section.

16. The individual identification card system according to claim 14, wherein said individual identification card device includes a time clock function means for controlling time information on an individual identification card.

17. The individual identification card system according to claim 14, comprising an operator restricting device having a door or lid that restricts individuals permitted to open and operate said door or lid, wherein said collating means is provided in relation to said operator restricting device.

18. The individual identification card system according to claim 1, wherein said individual identification card device includes a code erasing part for erasing the individual identification code from an inserted individual identification card, before the individual identification card inserted is retrieved in said card holding section.

19. The individual identification card system according to claim 18, wherein said individual identification card device includes a time clock function means for controlling time information on an individual identification card.

20. The individual identification card system according to claim 18, comprising an operator restricting device having a door or lid that restricts individuals permitted to open and operate said door or lid, wherein said collating means is provided in relation to said operator restricting device.

21. The individual identification card system according to claim 1, wherein said individual identification card device includes a time clock function means for controlling time information on an individual identification card.

22. The individual identification card system according to claim 21, comprising an operator restricting device having a door or lid that restricts individuals permitted to open and operate said door or lid, wherein said collating means is provided in relation to said operator restricting device.

23. The individual identification card system according to claim 1, comprising an operator restricting device having a door or lid that restricts individuals permitted to open and operate said door or lid, wherein said collating means is provided in relation to said operator restricting device.

* * * * *